United States Patent
Saika

(10) Patent No.: US 7,275,138 B2
(45) Date of Patent: Sep. 25, 2007

(54) SYSTEM AND METHOD FOR CONTROLLING THE UPDATING OF STORAGE DEVICE

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 11/009,034

(22) Filed: Dec. 13, 2004

(65) Prior Publication Data

US 2006/0085608 A1    Apr. 20, 2006

(30) Foreign Application Priority Data

Oct. 19, 2004    (JP)    ............... 2004-303726

(51) Int. Cl.
*G06F 12/16*    (2006.01)
*G06F 13/00*    (2006.01)
(52) U.S. Cl. .................. 711/154; 711/162
(58) Field of Classification Search ............ None
See application file for complete search history.

(56) References Cited

U.S. PATENT DOCUMENTS 5,649,152 A * 7/1997 Ohran et al. ............ 711/114
6,108,736 A * 8/2000 Bell ........................ 710/107
6,647,474 B2 * 11/2003 Yanai et al. ............. 711/162
2004/0210677 A1 * 10/2004 Ravindran et al. ....... 710/1

FOREIGN PATENT DOCUMENTS

JP    2002-278819    9/2002

* cited by examiner

*Primary Examiner*—Mano Padmanabhan
*Assistant Examiner*—Fred W Detschel
(74) *Attorney, Agent, or Firm*—Antonelli, Terry, Stout & Kraus, LLP.

(57) ABSTRACT

The present invention makes it possible to preserve any and all update data relating to the updating of a storage device. The present invention is devised so that if a first storage device (3S) is updated by writing data into this first storage device, the update data relating to the updating of the first storage device is written into a second storage device (3D). The system (100) comprises an acquisition portion (15) that acquires a use rate of the second storage device and a threshold value for this use rate, an updating stopping portion (7) which judges whether or not the acquired use rate exceeds the threshold value, and which stops the updating of the second storage device if the result of this judgment is affirmative, and an updating-stop canceling portion (8) which cancels the stopping if it is detected that the use rate of the second storage device has decreased after the stopping has been performed.

4 Claims, 15 Drawing Sheets

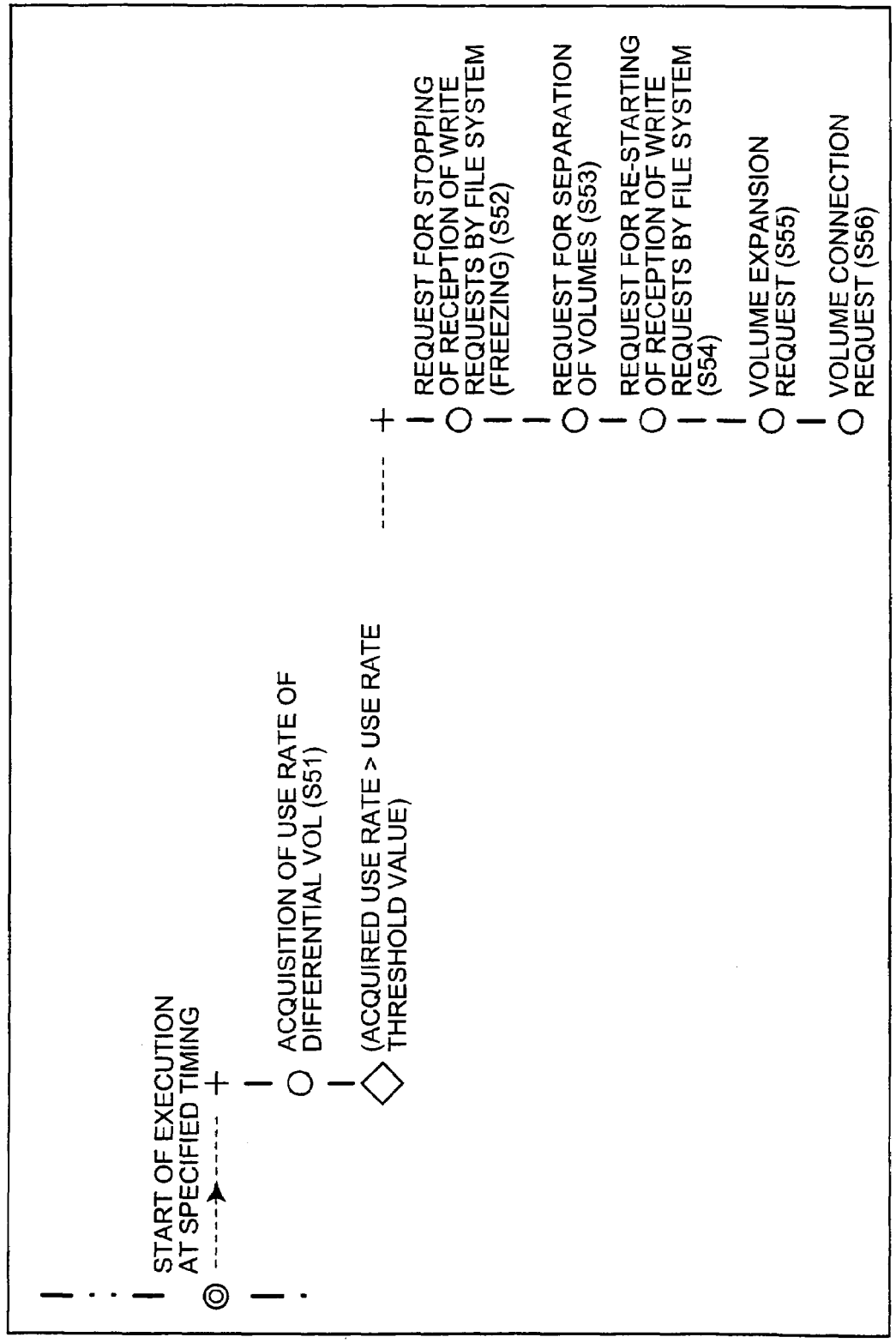

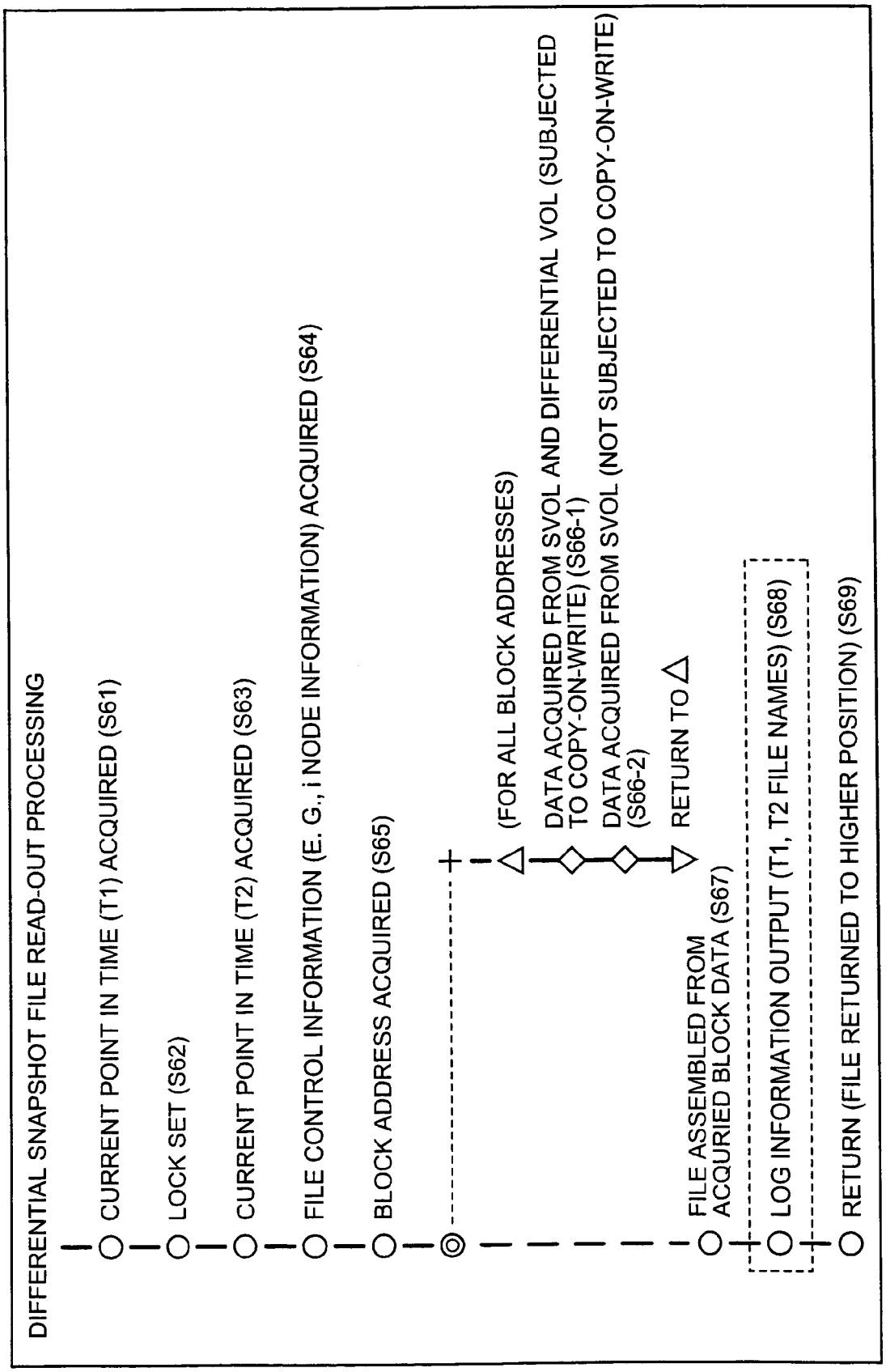

FIG. 9A

LOG INFORMATION

| T1 | T2 | FILE NAME |
|---|---|---|
| 12:00:05 | 12:00:10 | /usr/a.txt |
| 12:00:30 | 12:00:40 | /usr/a.txt |
| ⋮ | ⋮ | ⋮ |

FIG. 9B

| | |
|---|---|
| MONITORING FILE LIST | a.txt    b.txt |
| TIME INTERVAL | 10 MINUTES |
| LOCK WATING TIME | 4 SECONDS |
| NUMBER OF TIMES OF LOCKING | 2 TIMES |

FIG. 13A

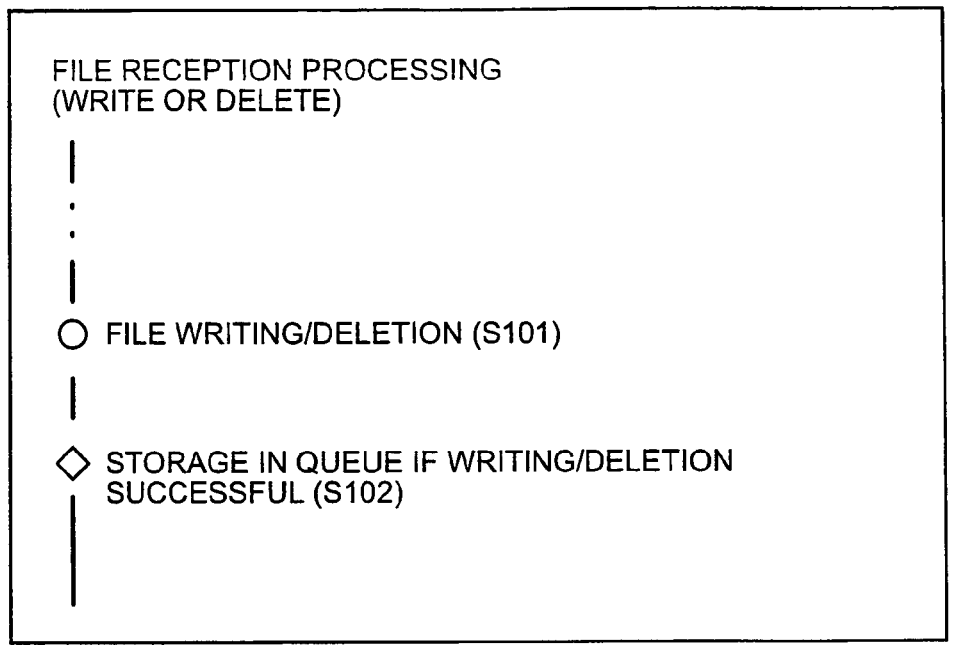

FILE RECEPTION PROCESSING
(WRITE OR DELETE)

○ FILE WRITING/DELETION (S101)

◇ STORAGE IN QUEUE IF WRITING/DELETION SUCCESSFUL (S102)

FIG. 13B

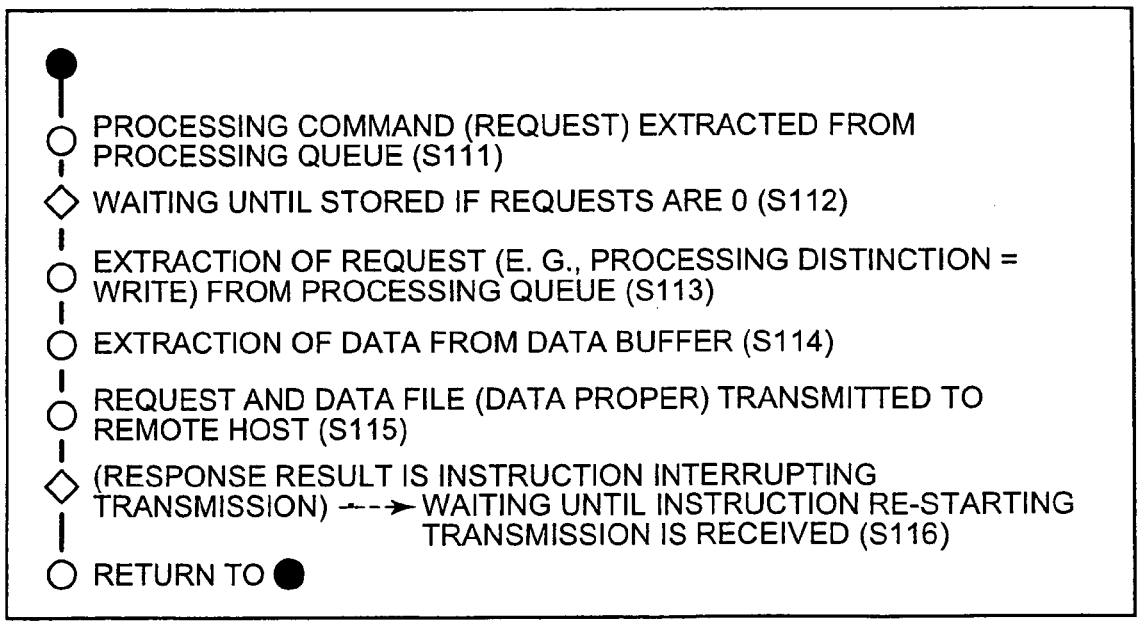

● 
○ PROCESSING COMMAND (REQUEST) EXTRACTED FROM PROCESSING QUEUE (S111)
◇ WAITING UNTIL STORED IF REQUESTS ARE 0 (S112)
○ EXTRACTION OF REQUEST (E. G., PROCESSING DISTINCTION = WRITE) FROM PROCESSING QUEUE (S113)
○ EXTRACTION OF DATA FROM DATA BUFFER (S114)
○ REQUEST AND DATA FILE (DATA PROPER) TRANSMITTED TO REMOTE HOST (S115)
◇ (RESPONSE RESULT IS INSTRUCTION INTERRUPTING TRANSMISSION) ---► WAITING UNTIL INSTRUCTION RE-STARTING TRANSMISSION IS RECEIVED (S116)
○ RETURN TO ●

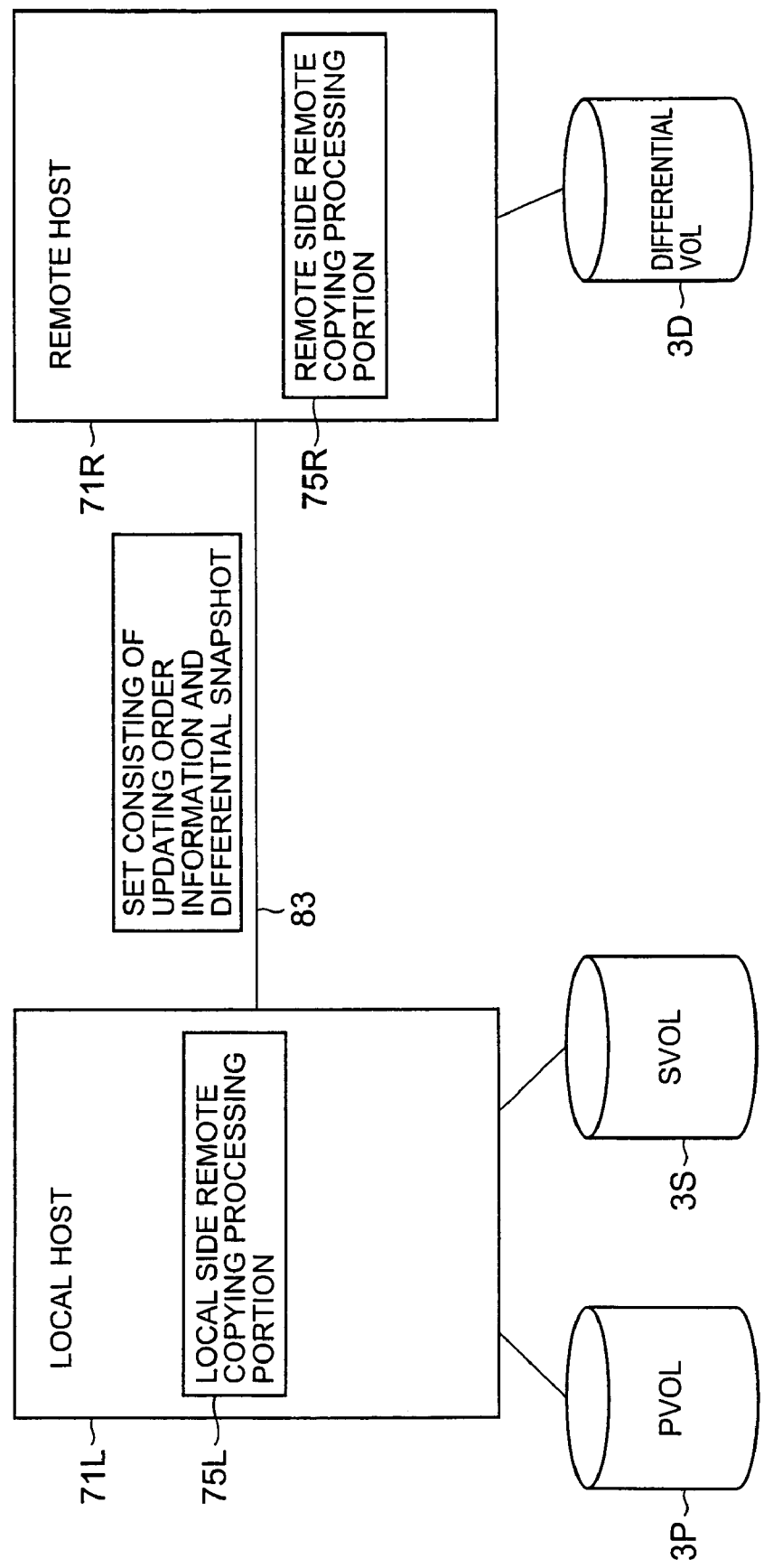

SYSTEM AND METHOD FOR CONTROLLING THE UPDATING OF STORAGE DEVICE

CLAIM OF PRIORITY

The present application claims priority from Japanese Application P2004-303726 filed on Oct. 19, 2004, the content of which is hereby incorporated by reference into this application.

BACKGROUND OF THE INVENTION

1. Field of the Invention

The present invention relates to a technique for controlling the updating of a storage device.

2. Description of the Related Art

For example, a technique in which a snapshot image of a data holding portion at a certain point in time is produced, and this snapshot image is held, as disclosed in Japanese Patent Application Laid-Open No. 2002-278819, is known as a technique of this type.

When the updating of a storage device is controlled by accumulating update data relating to the updating of this storage device (such as snapshot images or the like) in another storage device, accurate control of the updating of the storage device cannot be accomplished if this other storage device becomes full of update data so that new update data cannot be accumulated.

Accordingly, it is an object of the present invention to allow the preservation of any and all update data relating to the updating of a storage device.

Other objects of the present invention will become clear from the following description.

SUMMARY OF THE INVENTION

For example, if a first storage device is updated by writing data into this first storage device, update data relating to the updating of the first storage device is written into a second storage device. The system devised according to a first aspect of the present invention (hereafter referred to as the "first system") comprises an acquisition portion which acquires the use rate of the second storage device into which the update data relating to the updating of the first storage device is written, and the threshold value of this use rate, a first updating stopping portion which judges whether or not an acquired use rate has exceeded an acquired threshold value, and which stops the updating of the second storage device if the result of the judgment is affirmative, and an updating-stop canceling portion which cancels the stopping if it is detected that the use rate of the second storage device has decreased after the stopping has been performed.

At least one of the storage devices, i.e., the first storage device or second storage device, may be a physical storage device (e.g., a hard disk, optical recording medium, semiconductor memory or the like) or a logical storage device (e.g., a device called a logical unit or logical volume) disposed on such a physical storage device; alternatively, this storage device may be a data file that stores data.

For example, the updating-stop canceling portion can perform the cancel if it is detected that the use rate has dropped below the threshold value as a result of an increase in the storage capacity of the second storage device.

In a first embodiment of the first system, the first system further comprises a second updating stopping portion which performs the stopping when update data relating to data with a high updating frequency is read out.

In a second embodiment of the first system, the first storage device in the first embodiment is a secondary storage device, and the second storage device is a storage device used for update data. Furthermore, a primary storage device into which data is written as a result of the reception of a write request by a file system is also provided. The primary storage device and the secondary storage device are arranged so that these storage devices can be logically connected and logically cut off from each other. Furthermore, the system is arranged so that when the primary storage device and the secondary storage device are logically connected, data that is written into the primary storage device is copied into the secondary storage device. In this case, the first updating stopping portion stops the reception of write requests by the file system, and the stopping is performed by cutting off the logical connection between the primary storage device and the secondary storage device.

In a third embodiment of the first system, the second updating stopping portion in the second embodiment sets a lock that is used to prohibit the updating of data corresponding to update data that to be read-out among one or more sets of data accumulated in the primary storage device or the second storage device each time that the read-out of data is performed. Furthermore, the second updating stopping portion acquires a lock waiting time which is the length of time that is required in order to set the lock each time, an upper limit value of this lock waiting time, and a frequency threshold value; this second updating stopping portion investigates the number of times that the lock waiting time exceeds the upper limit value to judge whether or not the number of times that the upper limit value is exceeded exceeds the frequency threshold value. If the result of this judgment is affirmative, the second updating stopping portion stops the reception of write requests by the file system; this stopping is performed by cutting off the logical connection between the primary storage device and the secondary storage device.

In a fourth embodiment of the first system, the acquisition portion in the second embodiment acquires the use rate of the storage device used for the update data, and a threshold value for this use rate, each time that the file system receives a write request.

In a fifth embodiment of the first system, the acquisition portion in the second embodiment acquires another threshold value; if the use rate falls below this other threshold value, the acquisition portion acquires the use rate and threshold value of the same periodically, while if the use rate exceeds another threshold value, the acquisition portion acquires the use rate and threshold value of the same each time that the file system receives a write request.

In a sixth embodiment of the first system, the system in the second embodiment comprises a plurality of subsystems. At least the secondary storage device and the storage device used for update data are disposed in the same subsystem.

In a seventh embodiment of the first system, the system in the second embodiment comprises a plurality of subsystems. The primary storage device and the secondary storage device are disposed in the same subsystem. The storage device used for update data is disposed in a separate subsystem. The same subsystem transmits update data (to which updating order information used to specify the order of updating of the secondary storage device is attached) to the separate subsystem. The separate subsystem stores the update data to which the updating order information is attached in the storage device used for update data.

In an eighth embodiment of the first system, the acquisition portion acquires the use rate using use rate acquisition hardware which is hardware that acquires the use rate. The first updating stopping portion performs the stopping by means of software.

The method according to a second aspect of the present invention comprises the steps of acquiring the use rate of the secondary storage device into which update data relating to the updating of the first storage device is written, and a threshold value for this use rate, judging whether or not the acquired use rate has exceeded the acquired threshold value, and stopping the updating of the second storage device if the result of the judgment is affirmative, and releasing the stop if it is detected that the use rate of the second storage device has decreased after the stopping has been performed.

For example, the system is arranged so that snapshots of the secondary storage device are accumulated in a storage device used for snapshots by means of copy-on-write if data is written into the primary storage device, the data that has been written into the primary storage device is copied into the secondary storage device which is logically connected to the primary storage device, and data is copied into the secondary storage device. The system according to a third aspect of the present invention (hereafter referred to as the "third system") comprises a storage region (e.g., a memory) that stores the use rate of the storage device used for snapshots, and a processor (e.g., a microprocessor) that is operated by reading in at least one computer program. The system is devised so that the processor acquires the use rate of the storage device used for snapshots, performs a judgment as to whether or not the acquired use rate has exceeded the threshold value, and stops the copy-on-write if the result of the judgment is affirmative.

In a first embodiment of the third system, the system is devised so that a snapshot of the secondary storage device is accumulated in a storage device used for snapshots by copy-on-write if data is written into the primary storage device as a result of the file system receiving a write request, the data that is written into the primary storage device is copied into a secondary storage device that is logically connected to the primary storage device, and data is copied into the secondary storage device. In this case, if the result of the judgment is affirmative, the processor stops the reception of the write requests by the file system. Furthermore, the processor stops the copy-on-write by cutting off the logical connection between the primary storage device and the secondary storage device. When the use rate of the storage device used for the snapshot decreases, the processor re-starts the copy-on-write by logically connecting the primary storage device and the secondary storage device to each other.

In a second embodiment of the third system, the processor on the first embodiment sets a lock that is used to prohibit the updating of data corresponding to update data that is the object of read-out among the one or more sets of data accumulated in the primary storage device or the secondary storage device each time that update data is read out, acquires a lock waiting time which is the length of time that is required in order to set the lock each time, an upper limit value of this lock waiting time, and a frequency threshold value, investigates the number of times that the lock waiting time exceeds the upper limit value, and judges whether or not the number of times that the upper limit value is exceeded exceeds the frequency threshold value; if the result of this judgment is affirmative, updating stopping portion the processor stops the reception of write requests by the file system, and stops the copy-on-write by cutting off the logical connection between the primary storage device and the secondary storage device.

In a third embodiment of the third system, the system comprises a first site which is connected to the primary storage device, and which outputs data updating requests, and a second site which is connected to the secondary storage device and the storage device used for snapshots, and which receives the updating requests. The second site has a storage region which is used to accumulate the updating requests, and if the use rate of the storage region exceeds a specified value, a transmission interruption instruction is output to the first site, while if the use rate of the storage region drops below this specified value, a transmission re-start instruction is output to the first site. When the first site receives the transmission interruption instruction, even if data is written into the primary storage device, the first site does not transmit this data to the secondary storage device until the transmission re-start instruction is received.

In a fourth embodiment of the third system, the processor acquires the use rate using use rate acquisition hardware which is hardware that is used to acquire the use rate, and the reception of the write requests by the file system is accomplished by executing a computer program that is read in.

For example, if data is written into the primary storage device as a result of the reception of a write request by the file system, the data that is written into the primary storage device is copied into the secondary storage device that is logically connected to the primary storage device, and data is copied into the secondary storage device, then a snapshot of the secondary storage device is accumulated in a storage device used for snapshots by copy-on-write. The system according to a fourth aspect of the present invention (hereafter referred to as the "fourth system"), the system comprises a processor that is operated by reading in at least one computer program. The processor sets a lock that is used to prohibit the updating of data corresponding to update data that is the object of read-out among the one or more sets of data accumulated in the primary storage device or the secondary storage device each time that update data is read out, acquires a lock waiting time which is the length of time that is required in order to set the lock each time, an upper limit value of this lock waiting time, and a frequency threshold value, investigates the number of times that the lock waiting time exceeds the upper limit value, and judges whether or not the number of times that the upper limit value is exceeded exceeds the frequency threshold value; if the result of this judgment is affirmative, the processor stops the reception of write requests by the file system, and stops the copy-on-write by cutting off the logical connection between the primary storage device and the secondary storage device.

For example, if data is written into the primary storage device, the data that is written into the primary storage device is copied into the secondary storage device that is logically connected to the primary storage device, and data is copied into the secondary storage device, then a snapshot of the secondary storage device is accumulated-in a storage device used for snapshots by copy-on-write. In the method according to a fifth aspect of the present invention, the method comprises the step of acquiring the use rate of the storage region used for snapshots, the step of acquiring a threshold value for the use rate from the storage region, and the step of judging whether or not the acquired use rate has exceeded the threshold value, and stopping the copy-on-write if the result of the judgment is affirmative. This method may further comprise the step of re-starting the copy-on-write if the use rate of the storage device used for snapshots, has decreased.

For example, if data is written into the primary storage device as a result of the reception of a write request by the file system, the data that is written into the primary storage device is copied into the secondary storage device that is logically connected to the primary storage device, and data is copied into the secondary storage device, then a snapshot of the secondary storage device is accumulated in a storage device used for snapshots by copy-on-write. In the method according to a sixth embodiment of the present invention, the method comprises the step of setting a lock that is used to prohibit the updating of data corresponding to update data to be read-out among one or more sets of data accumulated in the primary storage device or the secondary storage device each time that update data is read out, the step of acquiring a lock waiting time which is the length of time that is required in order to set the lock each time, an upper limit value of this lock waiting time, and a frequency threshold value, and the step of investigating the number of times that the lock waiting time has exceeded the upper limit value, judging whether or not the number of times that the upper limit value has been exceeded exceeds the frequency threshold value, stopping the reception of write requests by the file system if the result of the judgment is affirmative, and stopping the copy-on-write by cutting off the logical connection between the primary storage device and the secondary storage device.

At least one of the first, third and fourth systems may be realized using a single computer machine, or may be realized using a plurality of computers. For example, personal computers, server machines, disk array devices comprising a plurality of physical storage devices or the like can be used as computer machines.

Furthermore, the subsystems may also be realized using a single computer machine, or using a plurality of computer machines.

The present invention makes it possible to preserve any and all update data relating to the updating of a storage device.

BRIEF DESCRIPTION OF THE DRAWINGS

FIG. 5 shows one example of the flow of the processing that is performed by the volume monitoring processing part;

FIG. 7 shows one example of the flow of the processing that is performed by the access monitoring processing portion in a case where a certain differential snapshot file read-out request is received by the file system;

FIG. 9A shows an example of the construction of the log information list which is one type of information that is input at the time of processing;

FIG. 9B shows respective concrete examples of the monitoring file list, time intervals, upper value of the lock waiting time and upper value of the lock frequency;

FIG. 13A shows one example of the flow of the processing that is performed by the file reception processing portion 85;

FIG. 13B shows one example of the flow of the processing that is performed by the file transmission processing portion 87;

FIG. 15 shows an outline of the construction of the system in one modification of the second example of the present invention.

DESCRIPTION OF THE PREFERRED EMBODIMENTS

Figure 1A:
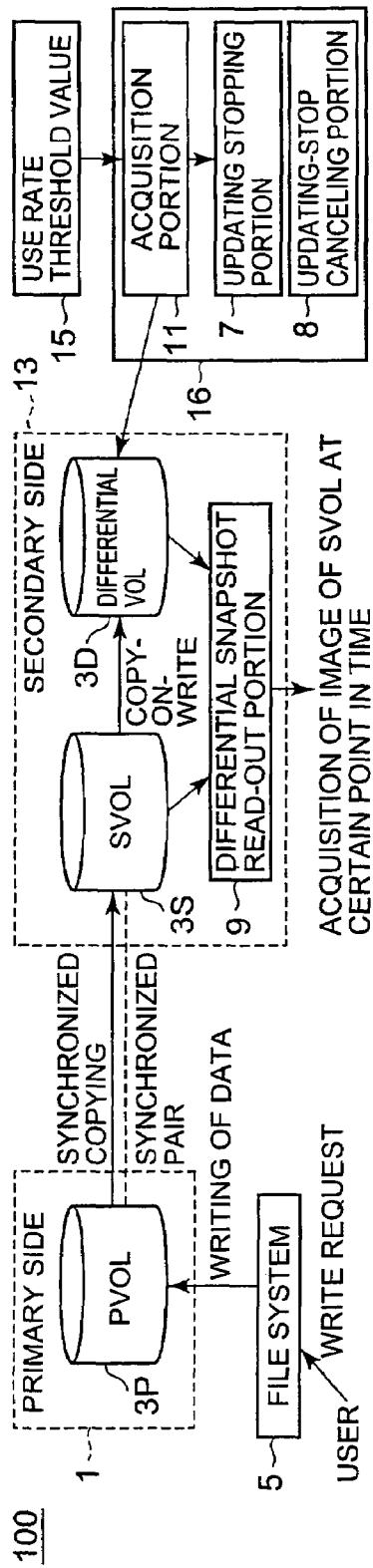
FIG. 1 shows a schematic outline of a system according to one embodiment of the present invention, with FIG. 1A showing a schematic outline (in concrete terms) of this system under ordinary conditions, and FIG. 1B showing a schematic outline in a case where the differential volume use rate has exceeded a specified threshold value.
Figure 1B:
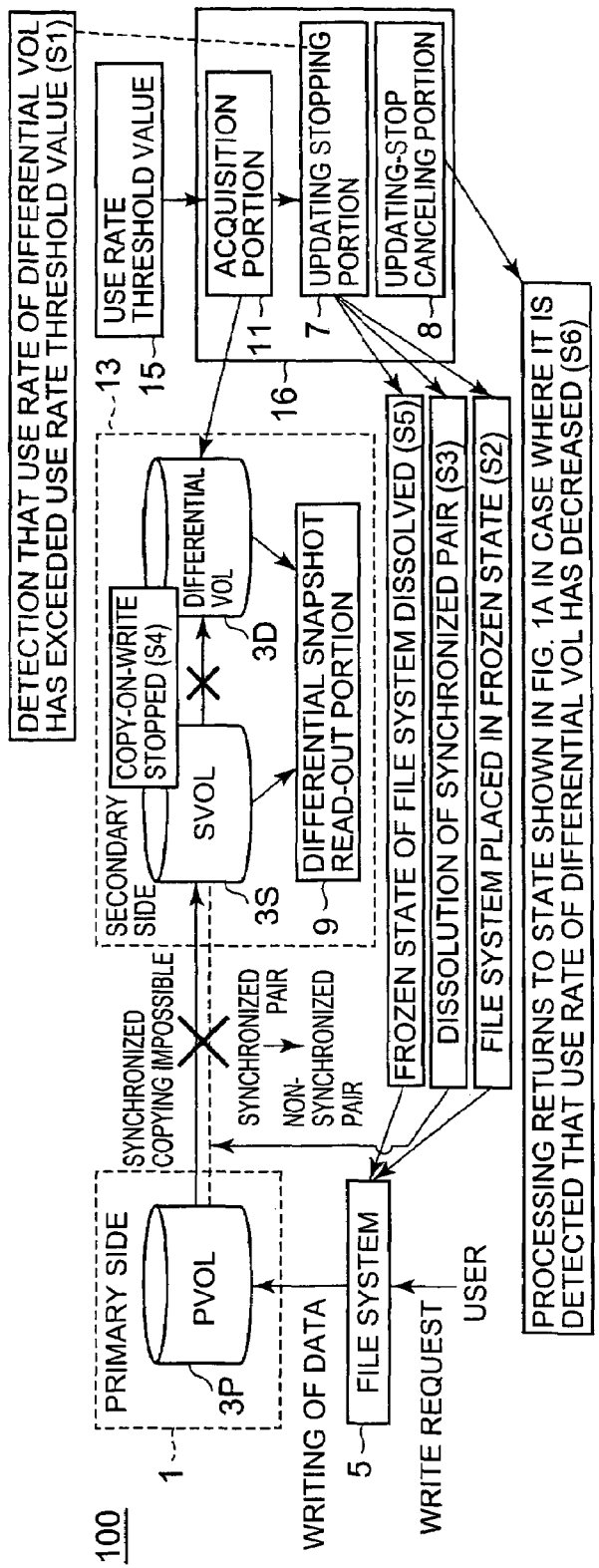

FIG. 1 shows a schematic outline of a system according to one embodiment of the present invention. In concrete terms, FIG. 1A shows a schematic outline of this system under ordinary conditions, and FIG. 1B shows an outline of the flow of the processing that is performed if the differential volume use rate exceeds a specified threshold value.

The system 100 of the present embodiment comprises a primary volume (PVOL) 3P, a file system 5, a secondary volume (SVOL) 3S, a differential volume (differential VOL) 3D, a differential snapshot read-out portion 9, a storage region 15, and a processor 16. The PVOL 3P is disposed, for example, on the primary side (e.g., in a site) 1, and the SVOL 3S, differential VOL 3D and differential snapshot read-out portion 9 are disposed on the secondary side (e.g., in another site) 13. Furthermore, the primary side 1 and secondary side 13 may be connected to the same computer machine, or may be connected to separate computer machines.

The PVOL 3P is a logical volume that constitutes a copying source of data; this is also disposed on one or a plurality of physical storage devices (not shown in the figures). When the file device receives a data write request from the user side, data according to this write request is written into the PVOL 3P.

The SVOL 3S is a logical volume that constitutes a copying destination for data; this is also disposed on one or a plurality of physical storage devices (not shown in the figures). The SVOL 3S can form a synchronized pair with the PVOL 3P. When a synchronized pair is formed between the SVOL 3S and PVOL 3P, data written into the PVOL 3P is copied into the SVOL 3S in synchronization with the writing of data into the PVOL 3P.

The differential VOL 3D is a logical volume that constitutes the storage destination of differential snapshots; this is also disposed on one or a plurality of physical storage devices (not shown in the figures). The differential snapshots stored in the differential VOL 3D are differential snapshots of the SVOL 3S. Here, the term "differential snapshot" refers to a snapshot expressing the difference (i.e., the fact that data A was present prior to updating) between the SVOL 3S following updating and the SVOL 3S prior to updating in a case where the SVOL S3 at a certain point in time (e.g., an SVOL in which data A and data B have been accumulated) is updated (e.g., a case in which data C is written over data A). For example, a differential snapshot of the SVOL 3S is produced and accumulated in the differential VOL 3D by a copy-on-write system each time that the SVOL 3S is updated.

The differential snapshot read-out portion 9 reads out the data inside the SVOL 3S and the differential snapshot inside the differential VOL 3D, and produces an image of the differential VOL 3D using the read-out data and differential snapshot. This processing can be realized by hardware, software and a combination of both.

The storage region 15 is one storage region present in a physical storage device such as a memory, hard disk or the like. A use rate threshold value is stored in the storage region 15. This use rate threshold value may be a fixed value or an alterable value. Furthermore, programs that are used to operate the acquisition portion 11, updating stopping portion 7 and updating-stop canceling portion 8 are stored in the storage region 15.

The processor 16 is a device that is operated by reading in a computer program; this device is a microprocessor that is incorporated into, for example, a CPU (central processor unit) or MPU (microprocessor unit). The processor 16 can respectively operate, for example, the acquisition portion 11, updating stopping portion 7 and updating-stop canceling portion 8 by reading in the acquisition portion 11, updating stopping portion 7 and updating-stop canceling portion 8 from a program storage region such as an ROM or the like.

The acquisition portion 11 acquires the use rate of the differential VOL 3D at a specified timing, e.g., periodically or when the file system 5 receives a write request. The use rate of the differential VOL 3D can be acquired as follows for example. Specifically, a hardware circuit (not shown in the figures) that acquires the use rate of the differential VOL 3D can be provided, and the acquisition portion 11 can acquire the use rate of the differential VOL 3D using this hardware circuit by transmitting a specified control signal to this hardware circuit.

The updating stopping portion 7 compares the use rate acquired by the acquisition portion 11 (i.e., the use rate of the differential VOL 3D) and the [above mentioned] use rate threshold value, and judges whether or not the use rate exceeds the use rate threshold value. As is shown I FIG. 1B, if it is judged that the use rate has exceeded the use rate threshold value (step S1), the updating stopping portion 7 places the file system 5 in a frozen state (in other words, a state in which the reception of write requests by the file system 5 is prohibited) (S2). As a result, the PVO[L] 3P is placed in a state in which neither the writing nor reading of data is possible. The updating stopping portion 7 dissolves the synchronized pair formed by the PVOL 3P and SVOL 3S (S3), and subsequently cancels the frozen state of the file system 5 (S5). As a result, the PVO[L] 3P is placed in a state in which both the writing and reading of data are possible. However, even if data is written into the PVOL 3P, this written data is not copied into the SVOL 3S at the same timing. Furthermore, when the synchronized pair is dissolved, the copy-on-write from the SVOL S3 to the differential VOL 3D is stopped (S4).

When the processing from S2 through S5 is performed, even if data is written into the PVOL 3P, this data is not written into the SVOL 3S in synchronization with this writing; accordingly, there is likewise no storage of a new differential snapshot in the differential VOL 3D. Consequently, during this period, the capacity of the differential VOL 3D can be increased. One method of accomplishing this is, for example, a method in which a logical volume in an unused pool state is set so that this volume can be used as the differential VOL 3D, thus causing the storage capacity of this logical volume in a pool state to be added to the storage capacity of the differential VOL 3D. If this is done, the use rate of the differential VOL 3D decreases. If it is detected that the use rate of the differential VOL 3D has decreased (e.g., when the use rate following this decrease and the use rate threshold value are compared, and if it is detected that the use rate following this decrease has dropped below the use rate threshold value.), the updating-stop canceling portion 8 can place the system in the state shown in FIG. 1A (i.e., the normal operating state) by again forming a synchronized pair between the PVOL 3P and SVOL 3S (S6). When a synchronized pair is again formed, if data is written into the PVOL 3P, this data is written into the SVOL 3S in synchronization [with the writing]; furthermore, a differential snapshot of the SVOL 3S is produced and stored in the differential VOL 3D. Specifically, copy-on-write is re-started.

Figure 2:
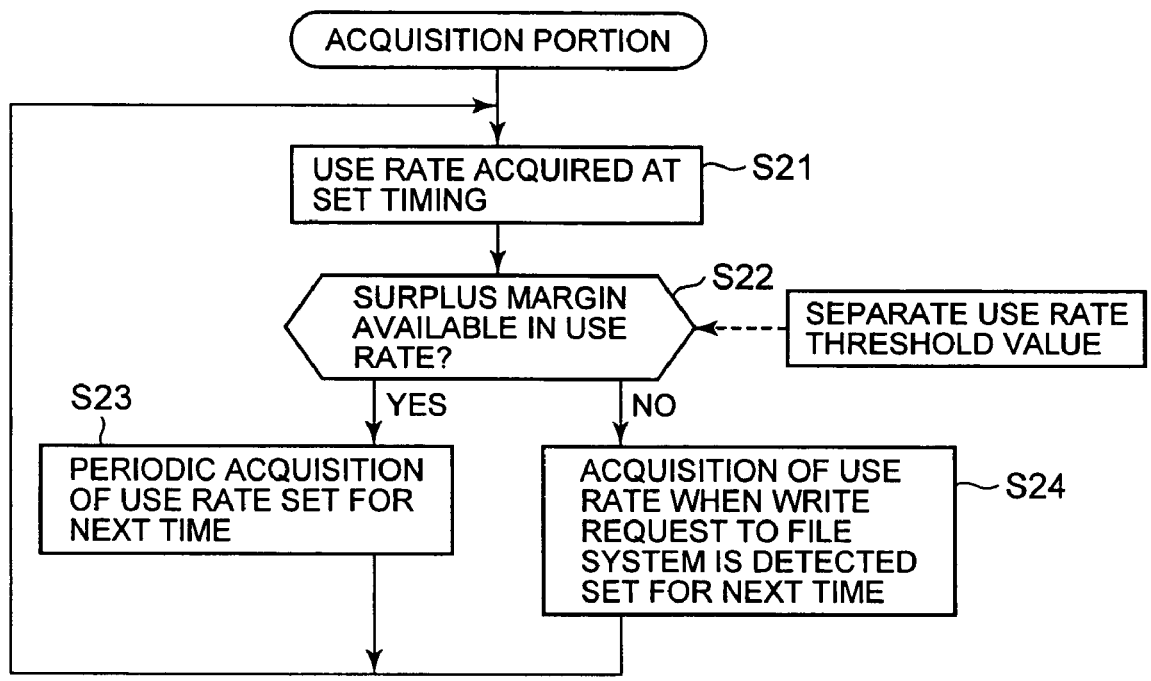
FIG. 2 shows the processing performed by the acquisition portion in a system according to one embodiment of the present invention.

Furthermore, in this embodiment, the acquisition portion 11 can execute the processing shown in FIG. 2.

Specifically, at a specified timing, the acquisition portion 11 acquires the use rate of the differential VOL 3D (S21), and judges whether or not there is any surplus margin in the use rate by comparing the acquired use rate and another use rate threshold value (S22). Another use rate threshold value is a value that is smaller than, for example, the use rate threshold value. Another use rate threshold value is stored in the storage region 15, and can be acquired from this storage region 15.

If the acquired use rate is equal to or greater than another threshold value, the acquisition portion 11 judges that there is a surplus margin [in the use rate] (YES in S22), and sets periodic acquisition of the use rate for the next time (S23). On the other hand, if the acquired use rate is smaller than another threshold value, the acquisition portion 11 judges that there is no surplus margin [in the use rate] (No in S22), and sets for the next time acquisition of the use rate when a write request for the file system 5 is detected (S24). These settings can be performed for, for example, a specified memory or register. When these settings are performed, the acquisition portion 11 executes S21 at a set timing. The use rate that is acquired by the execution of S21 is used not only in this processing, but also in the processing of the updating stopping portion 7. Furthermore, for example, when a write request to the PVOL 3P is detected (e.g., when such a write request is received from a host device not shown in the figures), the issuance of a write request to the file system 5 can be detected.

Figure 3A:
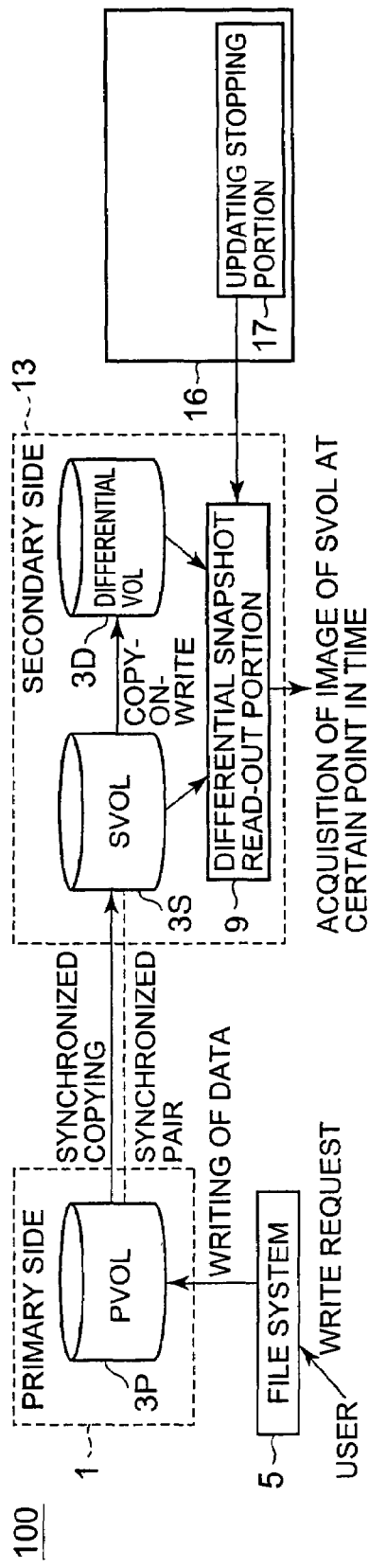
FIG. 3 shows a schematic outline of a system according to another embodiment of the present invention, with FIG. 3A showing a schematic outline (in concrete terms) of this system under ordinary conditions, and FIG. 3B showing an outline of the flow of the processing that is performed in a case where reference is made to differential snapshots of a file with a high updating frequency.
Figure 3B:
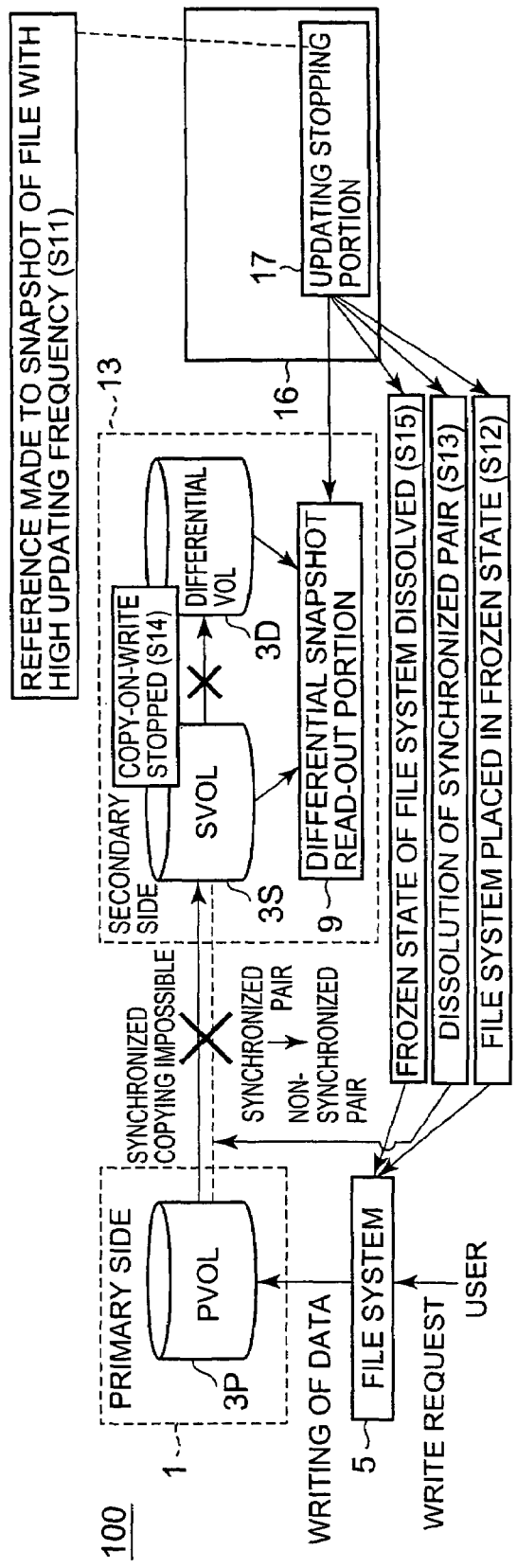

FIG. 3 shows a schematic outline of a system devised according to another embodiment of the present invention. In concrete terms, FIG. 3A shows a schematic outline of this system under ordinary conditions, and FIG. 3B shows an outline of the flow of the processing that is performed when reference is made to a differential snapshot of a file with a high updating frequency.

Another updating stopping portion 17 is read into the processor 16. When a differential snapshot is read in by the differential snapshot read-out portion 9, the updating stopping portion 17 investigates whether or not this differential snapshot is a differential snapshot of a data file with a high updating frequency. If it is judged that this snapshot is a differential snapshot of a data file with a high updating frequency (S11), the process of the steps S2 through S5 is performed (S12 through S15). In concrete terms, for example, the updating stopping portion 17 executes processing (exclusive processing) that places a lock on the data file corresponding to the differential snapshot (data file in the SVOL 3S). If the length of time required for this processing exceeds a specified length of time, and it is detected that this has been performed a specified number of times or greater, it can be judged that this differential snapshot is a differential snapshot of a data file with a high updating frequency.

In this processing, when reference is made to a differential snapshot of a data file with a high updating frequency, since the synchronized pair is dissolved following the freezing of the file system, copy-on-write is stopped. Accordingly, the speed of the read-out of the differential snapshots is increased.

Below, several examples in which at least one of the embodiments, i.e., the first embodiment or the other embodiment, is applied will be described.

EXAMPLE 1

Figure 4:
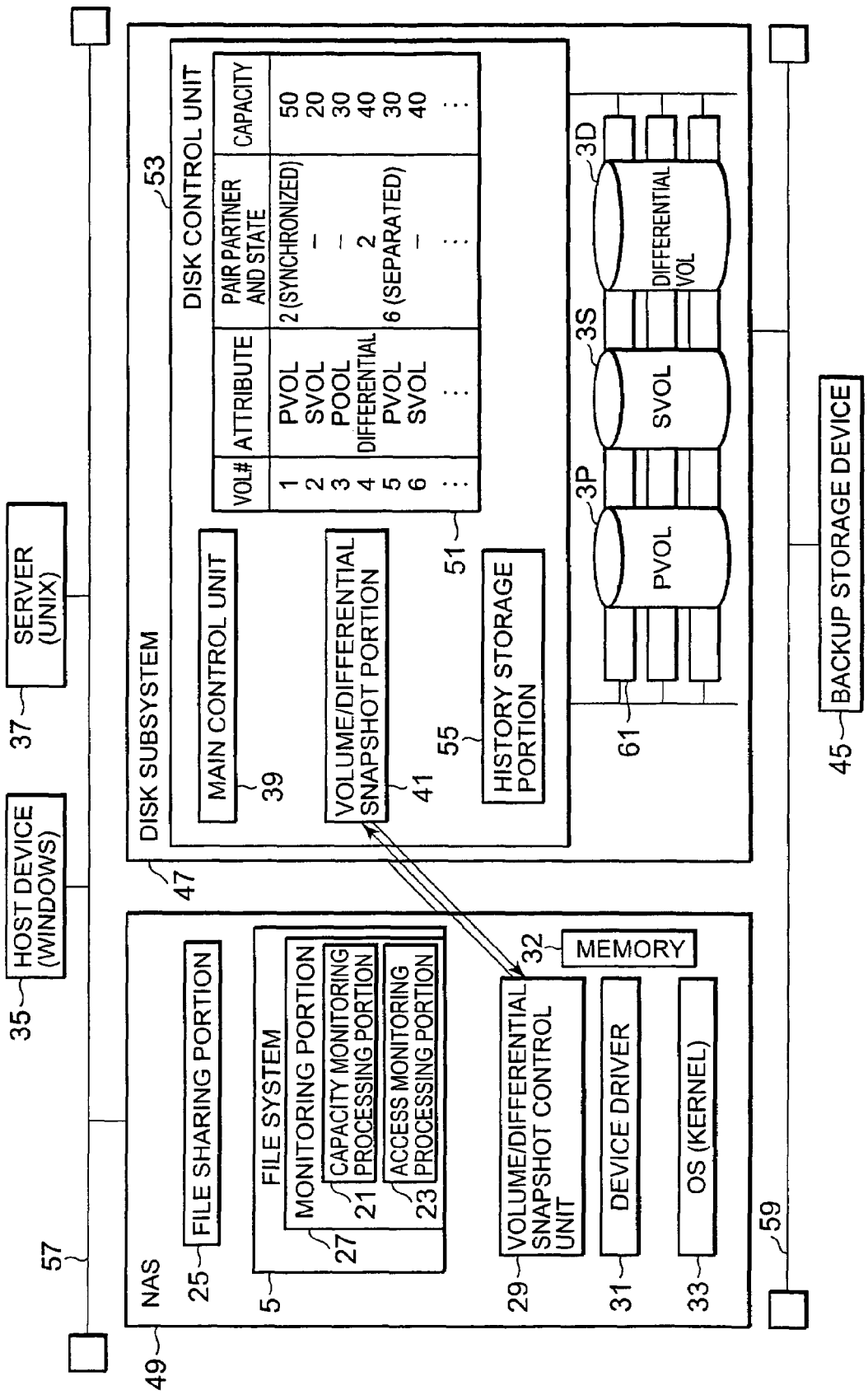
FIG. 4 shows an outline of the construction of the system in a first example of the present invention.

FIG. 4 shows an outline of the construction of the system in a first example of the present invention.

A host device 35, a server 37 and an NAS (network attached storage) 49 are connected to a first communications network (e.g., a network in which data is transferred in file units) 57. Furthermore, a disk subsystem 47 and a backup storage device (e.g., another disk system, a hard disk drive or the like) 45 are connected to a second communications network (e.g., a network in which data is transferred in file units or block units) 59.

The host device 35 is a computer machine in which a specified OS (e.g., Windows (registered trademark) is installed. Furthermore, the server 37 is also a computer machine in which a specified OS (e.g., Unix (registered trademark)) is installed. The host device 35 and server 37 can access the NAS 49 (e.g., can request writing or reading into or from the data file) via a first communications network 57.

The NAS 49 may have storage, or may function as a so-called NAS head without storage. The NAS 49 comprises a file sharing portion 25, a file system 5, a volume/differential snapshot control unit 29, a device driver 31, an OS 33 and a memory 32.

The file sharing portion 25 receives access from the host device 35 and server 37. The file sharing portion 25 is constructed so that this portion includes two file system protocols, i.e., NFS (Network File System) and Samba. The NFS receives file access requests from the server 37 mounting a UNIX (registered trademark) operating system operated by NFS. Meanwhile, the Samba receives file access requests from the host device 35 mounting a Windows (registered trademark) operating system operated by CIFS (Common Interface File System). File access requests (access requests at the file level) are converted into access requests at the block level. Furthermore, the term block refers to a data control unit in the storage region of the disk storage device 61 of the disk subsystem 47.

The file system 5 is a system that is use to control data accumulated in the respective VOLs 3P, 3S and 3D in a file format. The file system 5 is updated according to file access requests via the file sharing portion 25 (NFS/CIFS). A monitoring portion 27 is mounted in the file system 5. The monitoring portion 27 monitors the use rate (in other words, the empty capacity) of the differential VOL 3D either periodically or at the time of file updating requests via the file sharing portion 25. If the use rate is higher than the use rate threshold value (in other words, if the capacity is insufficient), the file system 5 is frozen, and the synchronized pair of the PVOL 3P and SVOL 3S is dissolved (in other words, the logical connection between the PVOL 3P and SVOL 3S is dissolved so that these parts are separated). If the differential VOL 3D is expanded (e.g., capacity is added) following the dissolution of the synchronized pair (in other words, following the separation of the volumes), the monitoring portion 27 again forms a synchronized pair from the PVOL 3P and SVOL 3SW. The monitoring portion 27 can perform such processing by appropriately using the memory 32. The monitoring portion 27 comprises a capacity monitoring processing portion 21 and an access monitoring processing portion 23. The respective processing parts 21 and 23 will be described later.

The volume/differential snapshot control unit 29 serves as an interface that is used by the monitoring portion 27 to call up a volume/differential snapshot portion 41 described later. The volume/differential snapshot control unit 29 receives, for example, the following requests (1) through (3) from the monitoring portion 27.

(1) Volume separation/connection requests which are requests for the separation or connection of the PVOL 3P and SVOL 3S.

(2) Use rate acquisition requests which are requests for the acquisition of the use rate of the differential VOL 3D.

(3) Expansion requests which are requests to perform expansion of the differential VOL 3D.

When the volume/differential snapshot control unit 29 receives one of the requests (1) through (3), this request is sent to the volume/differential snapshot portion 41.

The device driver 31 is a driver of the disk subsystem 47. Access to the disk subsystem 47 by the NAS 49 is performed using this device driver 31.

The disk subsystem 47 is, for example, an RAID (redundant array of independent disks) system. The disk subsystem comprises a plurality of disk type storage devices (e.g., hard disk drives) 61, and a disk control unit 53 that controls access to the disk type storage devices 61. A plurality of logical volumes can be prepared in the plurality of disk type storage devices 61 (the PVOL 3P, SVOL 3S and differential VOL 3D are shown as typical examples in FIG. 4). The disk control unit 53 comprises a volume control table 51, a main control unit 39, a volume/differential snapshot portion 41 and a history storage portion 55.

The volume control table 51 is a table that is used to control what type of pair is formed between which PVOL and which SVOL and the like. In the present example, for instance, the PVOL 3P and SVOL 3S can be logically separated by setting a pair state of "separated" in this volume control table 51; on the other hand, the PVOL 3P and SVOL 3S can be logically connected by setting a pair state of "synchronized". Furthermore, other types of information such as attributes of the respective logical volumes (e.g., PVOL, SVOL or differential VOL), the storage capacities of the respective logical volumes, which of the volumes are unused volumes (in other words, which of the volumes are in a pool state) and the like can also be controlled by this volume control table 51. This volume control table 51 may be stored by the disk subsystem 47 or NAS 42, or both.

The main control unit 39 is, for example, a microprocessor, and can control access to the respective volumes. For instance, when a write request for the PVOL 3P is received from NAS 49, if the pair state of this PVOL 3P and the SVOL 3S is "synchronized", the main control unit 39 writes data into the PVOL 3P, and also copies this data into the SVOL 3S from the PVOL 3P (the data that is the object of writing may also be duplexed in the memory, and the duplexed data may be written at one time into the PVOL 3P and SVOL 3S). Furthermore, when data is written into the SVOL 3S, the main control unit 39 can store a differential snapshot by copy-on-write in the differential VOL 3D corresponding to this SVOL 3S on the volume control table 51. Moreover, when data is written into the PVOL 3P while the PVOL 3P and SVOL 3S are logically separated, the main control unit 39 produces a snapshot of the PVOL 3P and temporarily stores this snapshot in the history storage portion 55. Then, when the PVOL 3P and SVOL 3S are again logically connected, the SVOL 3S can be updated in the same manner as the PVOL 3P on the basis of the snapshots accumulated in the history storage portion 55. Furthermore, the main control unit 39 can also acquire data from the SVOL 3S, acquire a differential snapshot from the differential VOL 3D, produce an image at a certain point in time using the acquired data and differential snapshot, and store the image thus produced in the backup storage device 45 via the second communications network 59.

The volume/differential snapshot portion 41 is, for example, a pure hardware circuit (this may also be a combination of hardware and software). Each time that the SVOL 3S is updated, the volume/differential snapshot portion 41 produces a differential snapshot by copy-on-write and stores this snapshot in the differential VOL 3D. When a differential snapshot is stored in the differential VOL 3D, the file system 5 is also updated; as a result, file system 5 can specify differential snapshots in a file format. Furthermore, the volume/differential snapshot portion 41 receives requests from the volume/differential snapshot control unit 29, and executes processing in accordance with these requests. For example, when the volume/differential snapshot portion 41 receives a volume separation/connection request for a certain pair, the volume/differential snapshot portion 41 performs processing that switches the pair state of this pair from synchronized to separated, or from separated to synchronized. Furthermore, for example, when the volume/differential snapshot portion 41 receives a use rate acquisition request, the volume/differential snapshot portion 41 acquires the use rate of the differential VOL 3D (e.g., if this is written into the table 51, this is acquired from the table 51), and notifies the NAS 49 of the acquired use rate. Moreover, for example, when the volume/differential snapshot portion 41 receives an expansion request, if volumes in a pool state registered in the table 51 are registered, the volume/differential snapshot portion 41 alters the content of the table 51 to a content for a case in which the volumes in a pool state are incorporated into the differential VOL 3D.

As was described above, a capacity monitoring processing portion 21 and an access monitoring processing portion 23 are provided in the monitoring portion 27.

The capacity monitoring processing portion 21 calls up the volume/differential snapshot portion 41 via the volume/differential snapshot control unit 29 periodically (or at the time of a write request to the file system 5), and acquires the use rate of the differential VOL 3D (e.g., the consumed capacity relative to the total capacity of the differential VOL 3D). The capacity monitoring processing portion 21 compares a use rate threshold value acquired from, for example, the memory 32 (e.g., an upper limit value provided by the manager) with the acquired use rate. As a result, if the use rate exceeds the use rate threshold value, the capacity monitoring processing portion 21 freezes the file system 5 (generally freezing the reception of access requests). Consequently, the file system 5 is placed in a resting state. Subsequently, the capacity monitoring processing portion 21 calls up the volume/differential snapshot portion 41, logically separates the PVOL 3P and SVOL 3S, and then cancels the freezing of the file system 5. Then, the capacity monitoring processing portion 21 calls up the volume/differential snapshot portion 41, and performs an expansion request for the differential VOL 3D. After the expansion of the differential VOL 3D has been detected, the capacity monitoring processing portion 21 logically connects the PVOL 3P and SVOL 3S (i.e., synchronizes these volumes) by issuing a volume connection request to the volume/differential snapshot control unit 29.

The access monitoring processing portion 23 monitors the file reference requests of the SVOL 3S, and if access collisions (cases in which reference is made to a differential snapshot of a file in which writing is to be performed in the SVOL 3S) occur frequently, the access monitoring processing portion 23 calls up the volume/differential snapshot portion 41, and logically separates the PVOL 3P and SVOL 3S. In concrete terms, for example, the access monitoring processing portion 23 performs locking of the file corresponding to the designated differential snapshot, and if the upper limit value of the designated lock waiting time is exceeded a specified number of times or greater within a designated time interval, the access monitoring processing portion 23 logically cuts off the PVOL 3P and SVOL 3S.

FIG. 5 shows one example of the flow of the processing that is performed by the capacity monitoring processing portion. Furthermore, the meanings of the symbols used in FIG. 5, FIGS. 6 through 8 and FIGS. 13 and 14 are as follows:

Double circle: call-up of a function (subroutine, subprogram or the like)

● (black circle): unconditional branching (proceeding or returning at the location of the black circle)

○ (circle): expresses processing

Δ (triangle): start of loop processing

∇ (inverted triangle): end of loop processing

◇ (diamond): conditional branching

+ (cross): start at branching destination

If a condition is satisfied in the case of a diamond, the processing on the right side indicated by - - - + is executed; if this condition is not satisfied, the processing proceeds to the step below.

The capacity monitoring processing portion 21 starts periodically (or when there is a write request to the file system 5).

The capacity monitoring processing portion 21 calls up the volume/differential snapshot portion 41 via the volume/ differential snapshot control unit 41, and acquires the use rate of the differential VOL 3D (S51).

The capacity monitoring processing portion 21 compares, for example, the use rate threshold value that is acquired from the memory 32 (e.g., an upper limit value provided by the manager) and the acquired use rate. As a result, if the use rate exceeds the use rate threshold value, the capacity monitoring processing portion 21 requests stopping of the reception of write requests by the file system 5, i.e., places the file system 5 in a frozen state (S52).

Subsequently, the capacity monitoring processing portion 21 controls the volume/differential snapshot control unit 29 so that a request for the logical separation of the PVOL 3P and SVOL 3S is output to the volume/differential snapshot portion 41 (S53). The volume/differential snapshot portion 41 that has received this request switches the pair state of the PVOL 3P and SVOL 3S in the volume control table 51 from "synchronized" to "separated". As a result, the PVOL 3P and SVOL 3S are logically separated. Furthermore, when a certain updated file of the PVOL 3P is in the process of being copied into the SVOL 3S, the capacity monitoring processing portion 21 executes this S53 after the copying of this file is completed. As a result, the logical separation of the PVOL 3P and SVOL 3S during the updating of a file is prevented.

Following S53, the capacity monitoring processing portion 21 requests re-starting of the reception of write requests by the file system 5, i.e., dissolves the frozen state of the file system 5 (S54). As a result, access to the PVOL 3P becomes possible.

Subsequently, the capacity monitoring processing portion 21 controls the volume/differential snapshot control unit 29 so that an expansion request for the differential VOL 3D is output to the volume/differential snapshot portion 41 (S55). The volume/differential snapshot control unit that has received this request adds the storage capacity of the volumes in a pool state to the storage capacity differential VOL 3D that is the object. The storage capacity in a pool state and the storage capacity of the differential VOL 3D before and after the addition are written into, for example, the volume control table 51.

After the expansion of the differential VOL 3D has been detected, the capacity monitoring processing portion 21 controls the volume/differential snapshot control unit 29 so that a volume connection request is issued to the volume/differential snapshot portion 41 (S56). The volume/differential snapshot portion 41 that has received this request switches the pair state of the PVOL 3P and SVOL 3S in the volume control table 51 from "separated" to "synchronized". As a result, the PVOL 3P and SVOL 3S are logically connected. Furthermore, the fact that the expansion of the differential VOL 3D has been completed is detected by detecting (for example) that the storage capacity of the differential VOL 3D in the volume control table 51 has increased. Furthermore, if the capacity monitoring processing portion 21 judges that the use rate has not exceeded the use rate threshold value as a result of comparing the use rate threshold value acquired from the memory 32 and the acquired use rate, the capacity monitoring processing portion 21 ends this processing without performing the processing of S52 through S56.

Figure 6A:
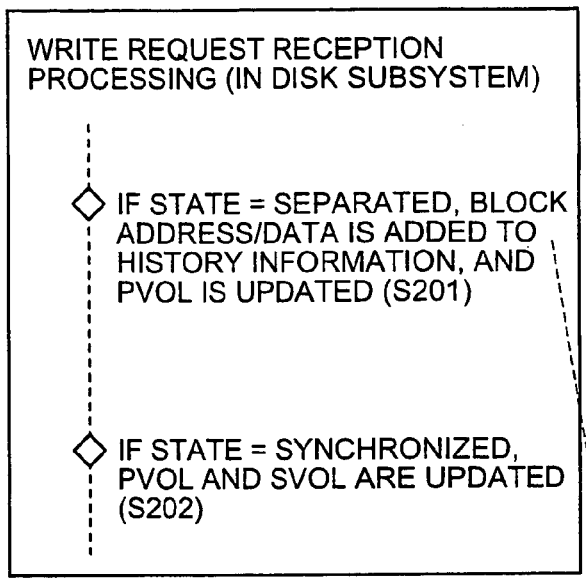
FIG. 6A shows one example of the flow of the write reception processing that is performed in the disk subsystem 47.

FIG. 6A shows one example of the flow of the write reception processing that is performed in the disk subsystem 47.

When a write request at the file level is received by the file sharing portion 25 of the NAS 49, this write request at the file level is converted into a write request at the block level, and this write request at the block level and the data that is the object of writing are output to the disk subsystem 47. The disk control unit 53 of the disk subsystem 47 refers to the volume control table 51, and when the write request at the block level is a data write request from a certain PVOL 3P, the pair state relating to this PVOL 3P is investigated.

When the pair state is "separated", the disk control unit 53 adds the block address and block data to the history information 66, and writes this block data into this block address in the PVOL 3P, so that the PVOL 3P is updated (S201). Furthermore, the history information 66 is information that is used to control the history indicating what data has been written into which locations in the PVOL 3P; for example, this information is a table in which sets of block addresses and block data are formed into single records, and one or more such records are listed in the table. The history information 66 is stored in, for example, the history storage portion 55 (see FIG. 4). Furthermore, the history storage portion 55 and the volume control table 51 may be located in the same memory, or may be located in another memories. Moreover, the processing that writes block addresses and block data into the history information 66 can be performed by the main control unit 39 or the volume/differential snapshot portion 41. The processing the updates the PVOL 3P can be performed by the main control unit 39. As a result of the processing of this S201, information indicating how the SVOL 3S should be updated is accumulated.

If the pair state is "synchronized", the disk control unit 53 writes data into the block addresses (addresses in the PVOL 3P) in accordance with the write request, and also copies this data into the SVOL 3S (S202).

Figure 6B:
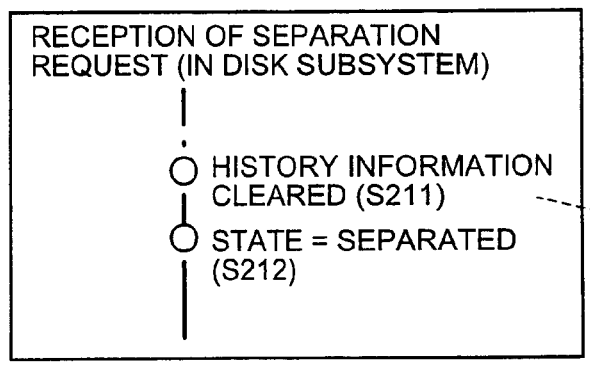
FIG. 6B shows one example of the volume separation request processing that is performed in the disk subsystem 47.

FIG. 6B shows one example of the flow of the volume separation request reception processing that is performed in the disk subsystem 47.

When the volume/differential snapshot portion 41 receives a volume separation request, the volume/differential snapshot portion 41 erases the information written into the history information 66 (S211), and switches the pair state corresponding to this volume separation request from "synchronized" to "separated" (S212). Furthermore, for example, the erasing of the history information 66 may also be performed when the pair state is switched from "separated" to "synchronized".

Figure 6C:
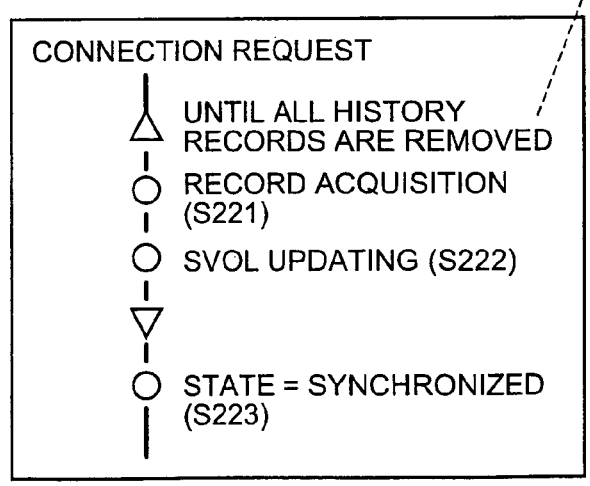

FIG. 6C shows one example of the flow of the volume connection request reception processing that is performed in the disk subsystem 47.

When the volume/differential snapshot portion 41 receives a volume connection request, the volume/differential snapshot portion 41 acquires a record from the history information 66 (S221), and writes the block data that is recorded in this record into the block address of the SVOL 3S that is recorded in this record (S222). The processing of S222 can be performed by the main control unit 39. The content of the SVOL 3S can be made identical to the content of the PVOL 3P by performing this S221 and S222 for all of the records in the history information 66. Specifically, the SVOL 3S can be made the history of the PVOL 3P. Furthermore, although this is not particularly indicated in the figures, a differential snapshot is accumulated in the differential VOL 3D by copy-on-write by means of the volume/differential snapshot portion 41 each time that the SVOL 3S is updated.

After S221 and S222 have been performed for all of the records in the history information 66, the volume/differential snapshot portion 41 sets the pair state of the pair that is the object of the volume connection request as "synchronized" (S223).

As a result of the processing shown in the FIGS. 6A through 6C, if the PVOL 3P is updated while the PVOL 3P and SVOL 3S are logically separated, an updating history of the PVOL 3P is accumulated each time. Furthermore, when the PVOL 3P and SVOL 3S are logically connected, the SVOL 3S is updated in the same manner as the PVOL 3P on the basis of the accumulated updating history; furthermore, a differential snapshot is produced and accumulated in the differential VOL 3D each time that the SVOL 3S is updated, and the PVOL 3P and SVOL 3S are logically connected after the SVOL 3S has become a duplicate of the PVOL 3P.

FIG. 7 shows one example of the flow of the processing that is performed by the access monitoring processing portion when the file system 5 receives a read-out request for a certain differential snapshot file.

When the file system 5 receives a read-out request for a certain differential snapshot file, the access monitoring processing portion acquires the current point in time (T1) at which this request was received (S61). The access monitoring processing portion 23 can acquire the current point in time (T1) by means of, for example, a timer (not shown in the figures) which is installed in the OS 33 of the NAS 49. Furthermore, the access monitoring processing portion 23 can accumulate this acquired current point in time (T1) in the memory 32.

The access monitoring processing portion 23 specifies the file corresponding to the differential snapshot file for which read-out was requested (among one or more files present in the SVOL 3S), and sets a lock for this file (S62). In other words, the access monitoring processing portion 23 performs exclusive processing for the specified file so that this file is not rewritten. In concrete terms, for example, the access monitoring processing portion 23 sets a specified flag for the file name of the file that is the object of locking among the file names of the respective files that are controlled by the file system 5.

When the setting of the lock is completed, the access monitoring processing portion 23 acquires the current point in time (T2) at which this setting was completed (S63). The access monitoring processing portion 23 can accumulate this acquired current point in time (T2) in the memory 32.

The access monitoring processing portion 23 acquires file control information (S64). In concrete terms, for example, the access monitoring processing portion 23 acquires i node information relating to the file name of the file for which a lock was set (in other words, the file corresponding to the differential snapshot for which read-out was requested) (S64). Although this is not shown in the figures, the file names of files in the SVOL 3S, the respective block data constituting these files and the respective block addresses where the respective block files, for example, are located are associated with the file control information such as i node information and the like. Furthermore, information indicating whether or not copy-on-write has been performed and information relating to differential snapshots of the block data stored in these block addresses (e.g., block addresses of the differential VOL 3D) are also associated with the respective block addresses.

The access monitoring processing portion 23 acquires block addresses relating to the file control information acquired in S64 (S65). Furthermore, if the acquired block addresses are addresses relating to copy-on-write (addresses where data is written into the differential VOL 3D by copy-on-write), the access monitoring processing portion 23 acquires data from the block addresses of the differential VOL associated with the acquired block addresses (S66-1). On the other hand, if the acquired block addresses are addresses that do not relate to copy-on-write (addresses where data is not written into the differential VOL 3D by copy-on-write), the access monitoring processing portion 23 acquires data from these acquired block addresses (addresses of the SVOL 3S) (S66-2). For all of the block addresses of the SVOL 3S that are associated with file control information acquired in S64, the access monitoring processing portion 23 performs either S66-1 or S66-2. Here, since copying from the PVOL 3P to the SVOL 3S can be performed in file units, it is possible to perform only one of the two steps, i.e., either S66-1 or S66-2, for the file control information acquired in S64.

The access monitoring processing portion 23 assembles a file from the acquired block data (S67). In concrete terms, for example, when data has been acquired from both the SVOL 3S and differential VOL 3D, the access monitoring processing portion 23 produces a data file for the SVOL 3S at the time of preparation of the differential snapshot using the data in the SVOL 3S and the differential snapshot in the differential VOL 3D. On the other hand, when data is acquired from only the SVOL 3S, the access monitoring processing portion 23 produces a file using this acquired data.

The access monitoring processing portion 23 outputs log information (S68). In concrete terms, the access monitoring processing portion 23 outputs a set consisting of the current point in time (T1) acquired in S61, the current point in time (T2) acquired in S63, and the file name of the file for which a lock was set in S62. The access monitoring processing portion 23 may accumulate these sets in, for example, the memory 32, or may store these sets in an arbitrary storage device (e.g., a logical volume).

The access monitoring processing portion 23 transmits the file assembled in S67 to the differential snapshot file read-out request source (e.g., the host device 35 or server 37) (S69).

Figure 8:
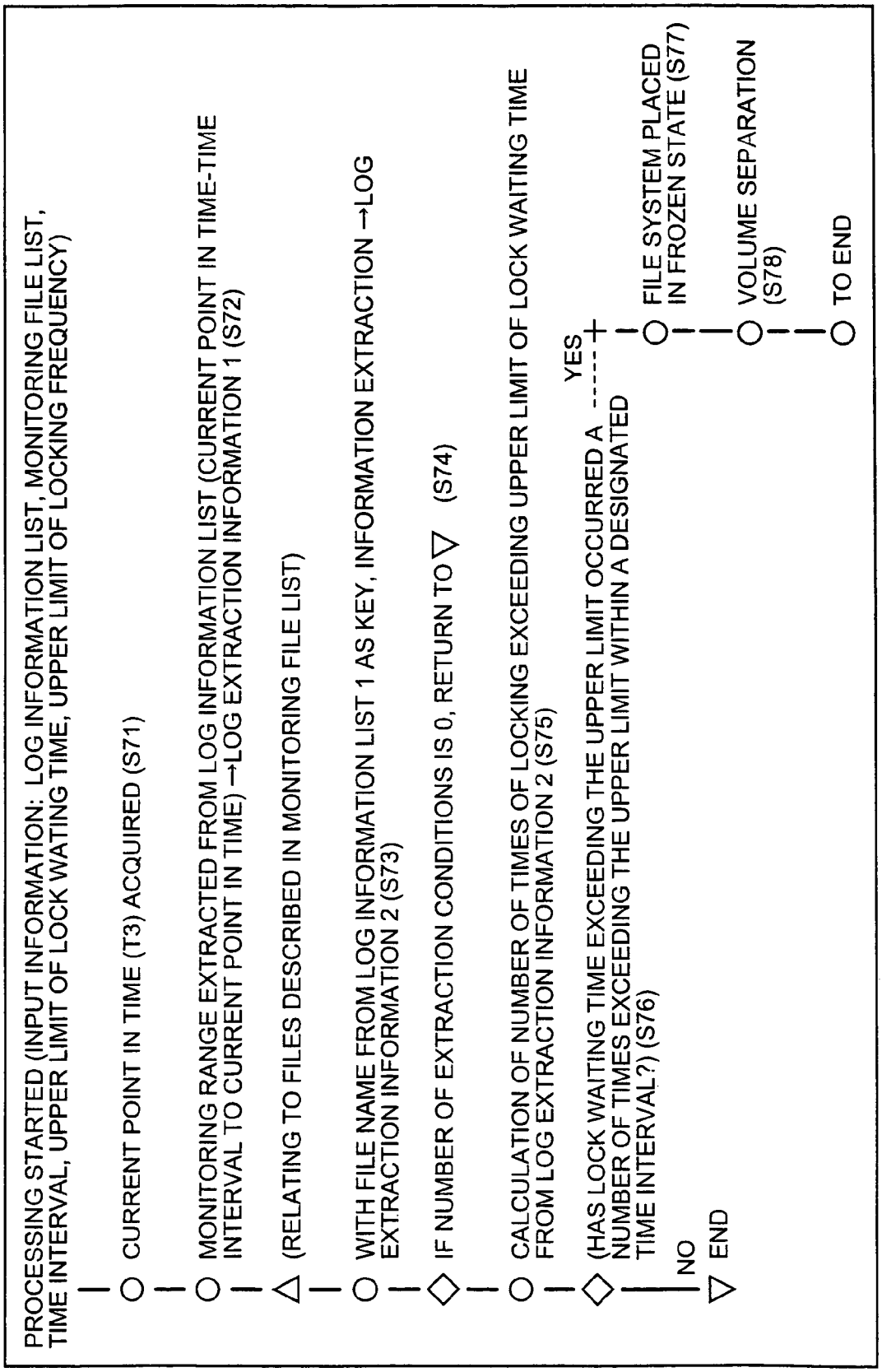
FIG. 8 shows one example of the flow of the volume updating control processing that is performed by the access monitoring processing portion.

FIG. 8 shows one example of the flow of the volume updating control processing that is performed by the access monitoring processing portion. FIG. 9A shows an example of the construction of the log information list, which is one type of information that is input in this processing. FIG. 9B shows respective concrete examples of the monitoring file list, time intervals, lock waiting time, upper limit value of the lock waiting time and upper limit value of the locking frequency.

The access monitoring processing portion 23 starts this volume updating control processing shown in FIG. 8 at a specified timing (e.g., periodically or as designated by another computer program or hardware). When this processing is started, the access monitoring processing portion 23 inputs a log information list (see FIG. 9A) in which the information set output in S68 of FIG. 7 (current point in time (T1), current point in time (T2) and file name) is registered, a monitoring file list which indicates the file names of one or a plurality of files that are the object of monitoring, the time interval (e.g., 10 minutes), the upper limit value of the lock waiting time (e.g., 4 seconds) and the upper limit value of the locking frequency (e.g., two times). One or more of the items of information, i.e., the monitoring file list, time interval, upper limit value of the lock waiting time and upper limit value of the locking frequency, may be fixed values, or may be values that can be altered by the user. These items of information may, for example, be input by the user from the host device 35 or server 37. The respective input items of information are stored in (for example) the memory 32.

The access monitoring processing portion 23 acquires the current point in time (T3) at which the processing is started (S71). The access monitoring processing portion 23 can accumulate the acquired values of this current point in time (T3) in the memory 32.

The access monitoring processing portion 23 extracts the monitoring range from the log information list (S72). In concrete terms, the access monitoring processing portion 23 extracts the information set in which the current point in time (T1) or the current point in time (T2), or both, are located between the current point in time (T3) and a point in time that precedes this current point in time (T3) by the input time interval (e.g., 10 minutes). The one or more information sets that are extracted by this processing are taken as log extraction information 1. the log extraction information 1 can be accumulated in, for example, the memory 32.

Next, access monitoring processing portion 23 extracts an information set including the file names registered in the monitoring file list from the log extraction information 1 (S73). Here, the extracted information set is taken as the log extraction information 2. This log extraction information 2 can also be accumulated in, for example, the memory 32. Furthermore, if not even a single information set is extracted in the processing of S73, there is no object of monitoring; accordingly, the processing is ended (S74).

The access monitoring processing portion 23 calculates the number of times of locking that exceeds the upper limit value of the lock waiting time from the log extraction information 2 (S75). In concrete terms, the access monitoring processing portion 23 calculates the lock waiting time by calculating the current point in time (T1) and current point in time (T2) for each information set contained in the log extraction information 2, and calculates the number of times of locking that exceeds the upper limit value of the lock waiting time by comparing the respective lock waiting times and the upper limit value of the lock waiting time.

If the calculated number of times of locking exceeds the upper limit value of the input locking frequency (YES in S76), the access monitoring processing portion 23 places the file system in a frozen state (S77), and then logically separates the PVOL 3P and SVOL 3S (S78).

The access monitoring processing portion 23 can perform this processing shown in FIG. 8 as one batch of processing.

Thus, according to this first example, if the use rate of the differential VOL 3D is higher than a specified threshold value, the file system 5 is placed in a frozen state, and the PVOL 3P and SVOL 3S are logically separated; as a result, copy-on-write to the differential VOL 3D from the SVOL 3S is stopped. Furthermore, if the use rate of the differential VOL 3D decreases, copy-on-write is re-started. Accordingly, the overflow of differential snapshots from the differential VOL 3D can be prevented in advance.

Furthermore, in this first example, when reference is made to a snapshot of a file with a high updating frequency (e.g., when the number of times that the lock waiting time has exceeded a specified upper limit value exceeds the upper limit value of the locking frequency), the file system 5 is placed in a frozen state, and the PVOL 3P and SVOL 3S are logically separated; accordingly, copy-on-write to the differential VOL 3D is stopped. As a result, an increase in the speed of read-out of differential snapshots from the differential VOL 3D can be achieved.

Furthermore, in this first example, the frozen state of the file system 5 is dissolved after the PVOL 3P and SVOL 3S are logically separated. Accordingly, the use rate of the differential VOL 3D can be reduced (e.g., the capacity of the differential VOL 3D can be expanded), and the read-out of differential snapshots can be performed, even while the file system receives write requests.

EXAMPLE 2

Figure 10:
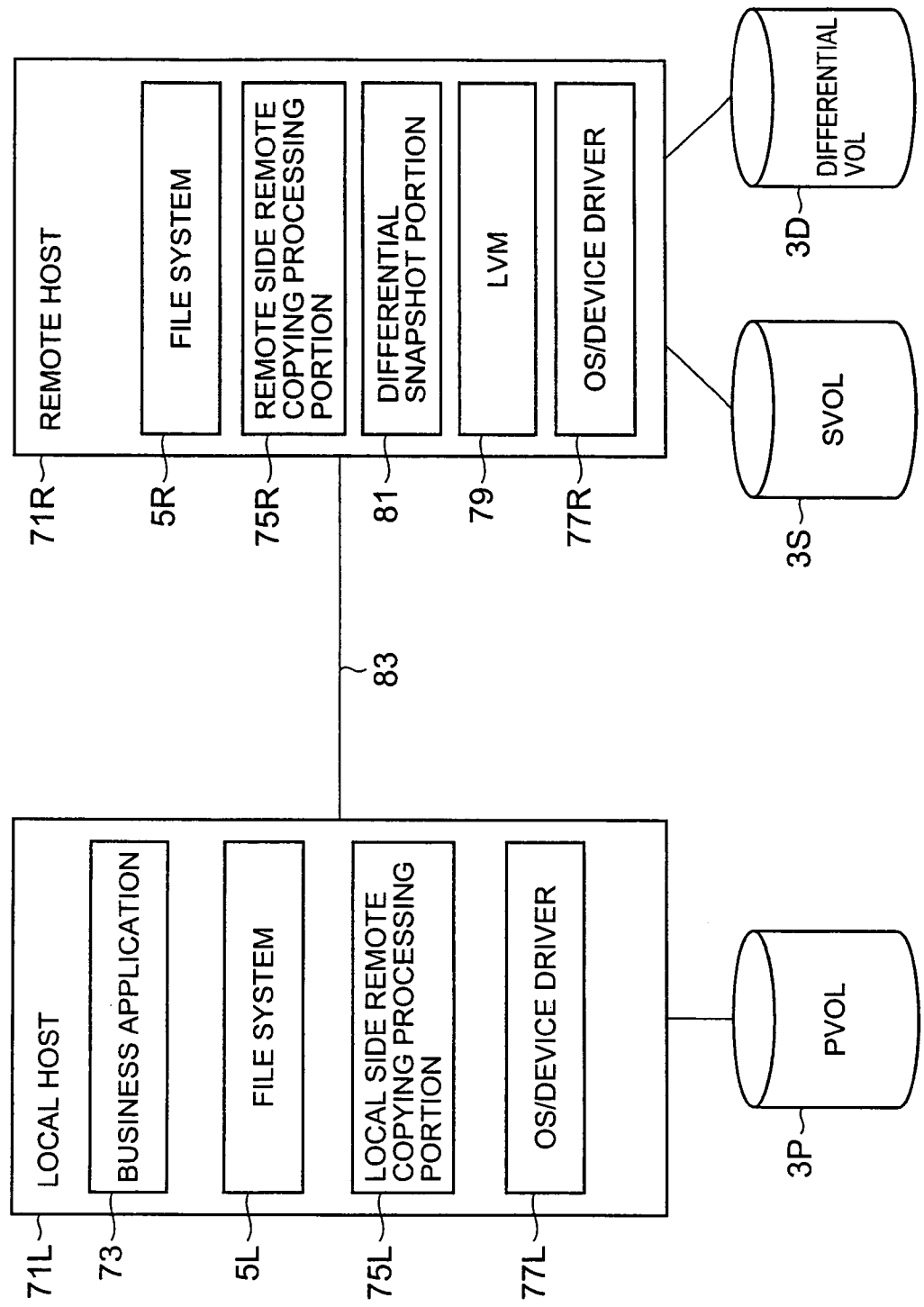
FIG. 10 shows an outline of the construction of the system in a second example of the present invention.

FIG. 10 shows an outline of the construction of a system according to a second example of the present invention.

A local host 71L and a remote host 71R that are connected to a data transfer line 83 are installed. The local host 71L and remote host 71R can be constructed as computer machines such as server machines or the like, or can be constructed as disk subsystems of the type described in the first example.

When a differential snapshot is acquired in this system, the remote host 71R stops data transfer by the remote host to the local host 71L, or the updating of the SVOL 3S in the remote host 71R is stopped, a differential snapshot portion 81 is called up, a differential snapshot is acquired, and this differential snapshot is stored in the differential VOL 3D. Subsequently, the remote host 71R re-starts data transfer in the local host 71L. Furthermore, if the use rate of the differential VOL 3D exceeds the upper limit value, the remote host 71R issues a request to stop data transfer to the local host 71L, and after this data transfer is stopped, the remote host 71R waits for a reduction in the use rate of the differential VOL 3D (e.g., expands the capacity of the differential VOL 3D). After this use rate decreases (e.g., after the expansion of the capacity of the differential VOL 3D is completed), the remote host 71R re-starts data transfer for the local host 71L. Furthermore, the expansion of the capacity of the differential VOL 3D can be accomplished by the same method as that used in the disk subsystem in the first example. Specifically, although this is not shown in the figures, the remote host 71R comprises a table similar to the volume control table of the disk subsystem, and can accomplish expansion of the capacity of the differential VOL 3D by updating the content of this table.

Although this is not shown in the figures, a PVOL 3P disposed on a disk type storage device is connected to the local host 71L. The local host 71L comprises, for example, a business application 73, a file system 5L, a local side remote copying processing portion 75L, and an OS/device driver 77L. The business application 73, file system 5L, local side remote copying processing portion 75L and OS/device driver 77L can be operated by being read into, for example, a CPU not shown in the figures.

An SVOL 3S and differential VOL 3D disposed on a disk type storage device (not shown in the figures) are connected to the remote host 71R. The remote host 71R comprises, for example, a file system 5R, a remote side remote copying processing portion 75R, a differential snapshot portion 81, an LVM (logical volume manager) 79, and OS/device driver 77R. The file system 5R, remote side remote copying processing portion 75R, LVM 79 and OS/device driver 77R can be operated by, for example, being read into a CPU not shown in the figures. Furthermore, the differential snapshot portion 81 can be formed as a hardware circuit, or can be formed as software. The differential snapshot portion 81 can produce a differential snapshot and write this differential snapshot into the differential VOL 3D by copy-on-write each time that the SVOL 3S is updated.

Figure 11:
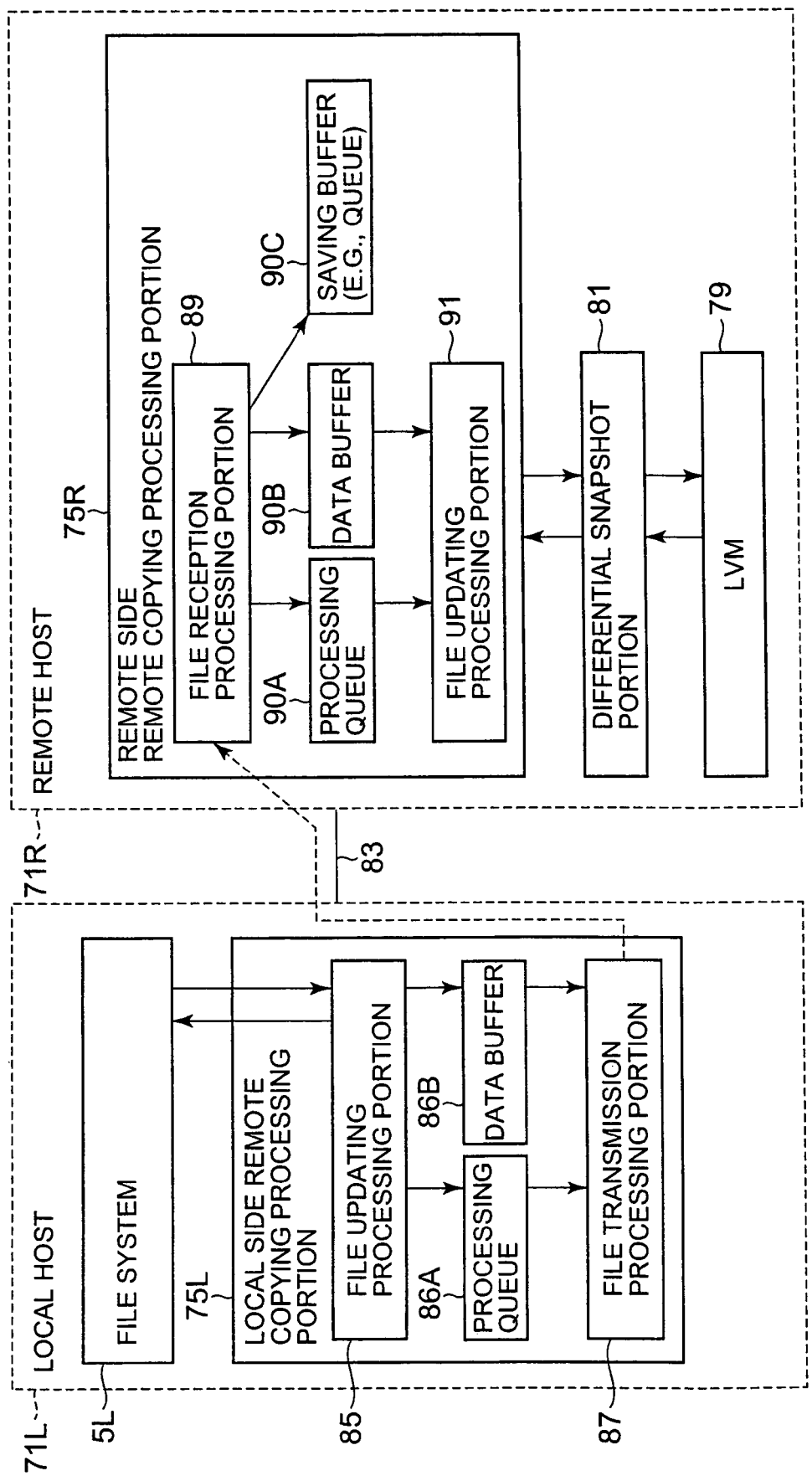
FIG. 11 shows in concrete terms portions relating to the essential parts of the system in a second example of the present invention.

FIG. 11 shows in concrete terms portions relating to the essential parts of a system according to a second example of the present invention.

The local side remote copying processing portion 75L is software that is used to write data written into the PVOL 3P into an SVOL 3S connected to the remote host 71R via a data transfer line 83. The local side remote copying processing portion 75L comprises a file reception processing portion 85, and a file transmission processing portion 87. The file reception processing portion 85 and file transmission processing portion 87 are devised so as to exchange commands or data via (for example) storage regions disposed in a memory not shown in the figures, e.g., a processing queue 86A and a data buffer 86B.

Figure 12:
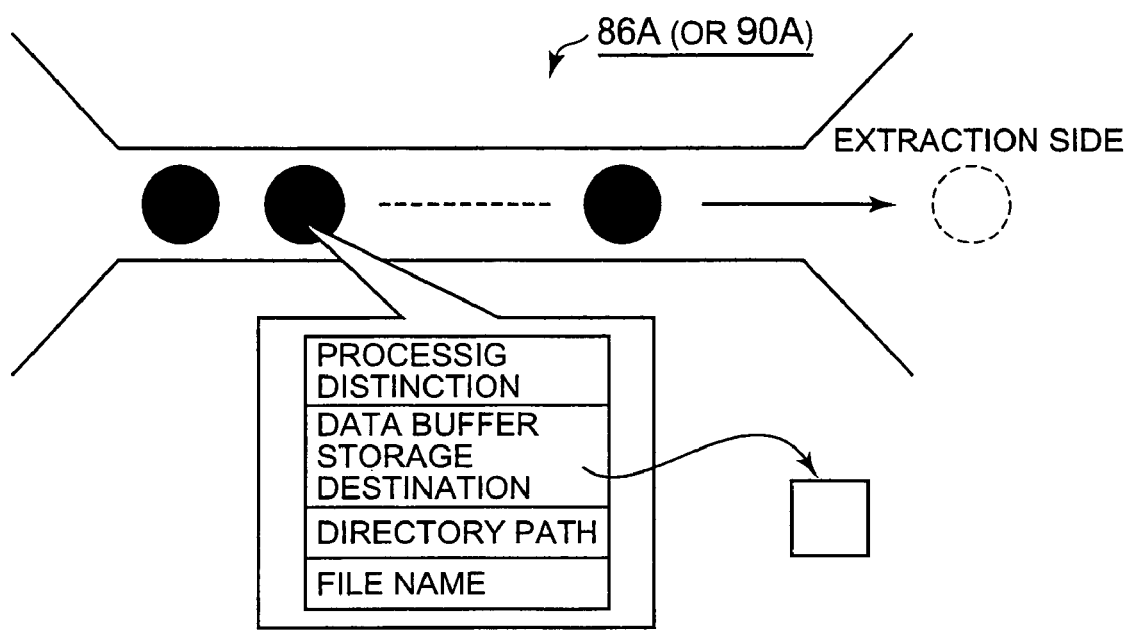
FIG. 12 shows an outline of the processing queue in the system in a second example of the present invention.

As is shown for example in FIG. 12, the file reception processing portion 85 produces processing commands, and registers the produced processing commands in the processing queue 86A. The processing commands include, for example, a processing distinction (e.g., write or delete), data buffer storage destination (location information indicating the location in the data buffer where data proper is stored), directory path (name of path to directory where data files stored in PVOL 3P are located) and file names (names of data files). For instance, when the file reception processing portion 85 requests the remote copying of data (data transfer via the data transfer line 83) from the file transmission processing portion 87, the file reception processing portion 85 produces a processing command that includes the processing distinction "write", the data buffer storage destination for the data and the like, and registers this processing command in the processing queue 86A. Furthermore, the file reception processing portion 85 registers the data proper in the data buffer 86B. In the processing queue 86A, the storage and read-out of commands or data are accomplished using, for example, an FIFO (first in first out) system.

The file transmission processing portion 87 extracts processing commands (e.g., transmission requests) from the processing queue 86A, and transmits the data files specified by these processing commands, and write requests (e.g., requests that include the contents of the processing commands), to the remote host 71R via the data transfer line 83. Furthermore, following the transmission of data files, the file transmission processing portion 87 receives a response status (OK, NG, instruction interrupting transmission, instruction re-starting transmission) from the remote host 71R. When an instruction interrupting transmission is received, the import of this instruction is set in a specified storage region (e.g., register or memory); subsequently, while such an instruction interrupting transmission is set, the file transmission processing portion 87 stops the transmission of data written into the PVOL 3P until an instruction re-starting transmission is received from the remote host, even if the PVOL 3P is updated. Furthermore, when the PVOL 3P is updated while data transmission is stopped, the file transmission processing portion 87 can accumulate a history indicating how updating has been performed in a storage region (not shown in the figures). This can be accomplished, for example, by the same method as that used in the disk subsystem 47 described in the first embodiment. Furthermore, when an instruction re-starting transmission is received, the file transmission processing portion 87 can cause the results of the updating of the PVOL 3P to be reflected in the SVOL 3S by the same method as that used in the disk subsystem 47 described in the first embodiment.

The remote side remote copying processing portion 75R is software that is used to receive data that is written into the PVOL 3P via the data transfer line 83, and to store the received data in the SVOL 3S. The remote side remote copying processing portion 75R comprises a file reception processing portion 89 and a file updating processing portion 91. The file reception processing portion 89 and file updating processing portion 91 are devised so as to exchange commands or data via, for example, (for example) storage regions disposed in a memory not shown in the figures, e.g., a processing queue 90A and a data buffer 90B.

When a request (e.g., write request, delete request, read-out request or the like) is received from local host 71L, the file reception processing portion 89 registers this request in the processing queue 90A. If further registration in the processing queue 90A is impossible, the file reception processing portion 89 sends an instruction interrupting transmission to the local host 71L. Furthermore, when a write request and data file are received, the file reception processing portion 89 stores the write request in the processing queue 90A, and stores the data file in the data buffer 90B. In this case, the file reception processing portion 89 can use the data buffer storage destination contained in the write request as information that indicates the storage location in the data buffer 90B.

The file updating processing portion 91 calls up the differential snapshot portion 81, and acquires the use rate of the differential VOL 3D. If the use rate is lower than the use rate threshold value (a threshold value that is read out from a storage region that is not shown in the figures), the file updating processing portion 91 extracts the data file from the data buffer 90B, and updates the remote side file system 5R (see FIG. 10) using this data file. Furthermore, if the use rate exceeds the use rate threshold value (e.g., upper limit value), the file updating processing portion 91 holds the received request and data file in a buffer used for saving (some other storage region may also be used) 90C, and transmits an instruction interrupting transmission to the local host 71L. After stopping data transfer from the local host 71L, the file updating processing portion 91 instructs the differential snapshot portion to wait for a decrease in the use rate of the differential VOL 3D (e.g., issues a request for an expansion of the capacity of the differential VOL 3D). The differential snapshot portion 81 expands the capacity of the differential VOL 3D using the LVM 79. After the completion of the capacity expansion is detected, the file updating processing portion 91 acquires the request (and data file) from the saving buffer 90C, and performs writing, deletion or the like with respect to the SVOL 3S. The processing that is performed by the file updating processing portion 91 can be periodically repeated by, for example, loop processing. Furthermore, the expansion of the capacity of the differential VOL 3D can be performed in the same manner as in the first example. For instance, the LVM 79 can expand the capacity of the differential VOL 3D by holding a volume control table 51 similar to that used in the first example and updating this table in response to requests from the differential snapshot portion 81.

Furthermore, when the differential VOL 3D is updated (e.g., when data is written or deleted), a differential snapshot can be stored in the differential VOL 3D by copy-on-write performed by the differential snapshot portion 81 or LVM 79.

One example of the flow of the processing that is performed in this second example will be described below.

FIG. 13A shows one example of the flow of the processing that is performed by the file reception processing portion 85.

In accordance with requests from the file system 5L, the file reception processing portion 85 performs the writing or deletion of data files present in (for example) the PVOL 3P (S101). When the file reception processing portion 85 is successful in the writing or deletion of data files, the file reception processing portion 85 produces a processing command that includes "write" or "delete" as the processing distinction, and stores the processing command in the processing queue 86A (S102).

FIG. 13B shows one example of the flow of the processing that is performed by the file transmission processing portion 87.

The file transmission processing portion 87 can execute the processing shown in FIG. 13B, for example, periodically.

The file transmission processing portion 87 extracts a request (processing command) from the processing queue 86A (S111). If the number of requests is zero, the file transmission processing portion 87 waits until the request is stored in the processing queue 86A (S112).

When the file transmission processing portion 87 acquires, for example, a request in which the processing distinction is "write" (S113), the file transmission processing portion 87 acquires the data file specified by this request from the data buffer 86B (S114), and transmits a write request based on the acquired request, and the acquired data file, to the remote host 71R (S115). Subsequently, when the file transmission processing portion 87 receives a response status of "instruction interrupting transmission" from the remote host 71R, the file transmission processing portion 87 sets the import of this response status, and subsequently stops the transmission of data written into the PVOL 3P until an instruction re-starting transmission is received from the remote host, even if the PVOL 3P is updated (S116).

Furthermore, in this processing, when the file transmission processing portion 87 acquires a request whose processing distinction is "delete" from the processing queue 86A, the file transmission processing portion 87 transmits information that is used to specify the file that is the object of deletion (e.g., the file name), and a deletion request, to the remote host 71R.

Figure 14A:
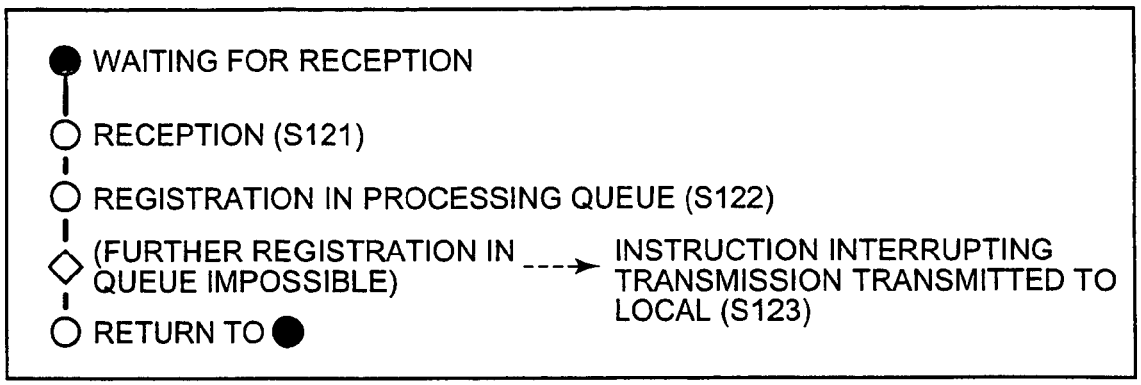
FIG. 14A shows one example of the flow of the processing that is performed by the file reception processing portion 89.

FIG. 14A shows one example of the processing that is performed by the file reception processing portion 89.

When the file reception processing portion 89 receives a request (e.g., a write request, delete request, read-out request or the like) from the local host 71L (S121), the file reception processing portion 89 registers this request in the processing queue 90A (S122).

Furthermore, if further registration is impossible in the processing queue 90A, the file reception processing portion 89 sends an instruction interrupting transmission to the local host 71L (S123).

Figure 14B:
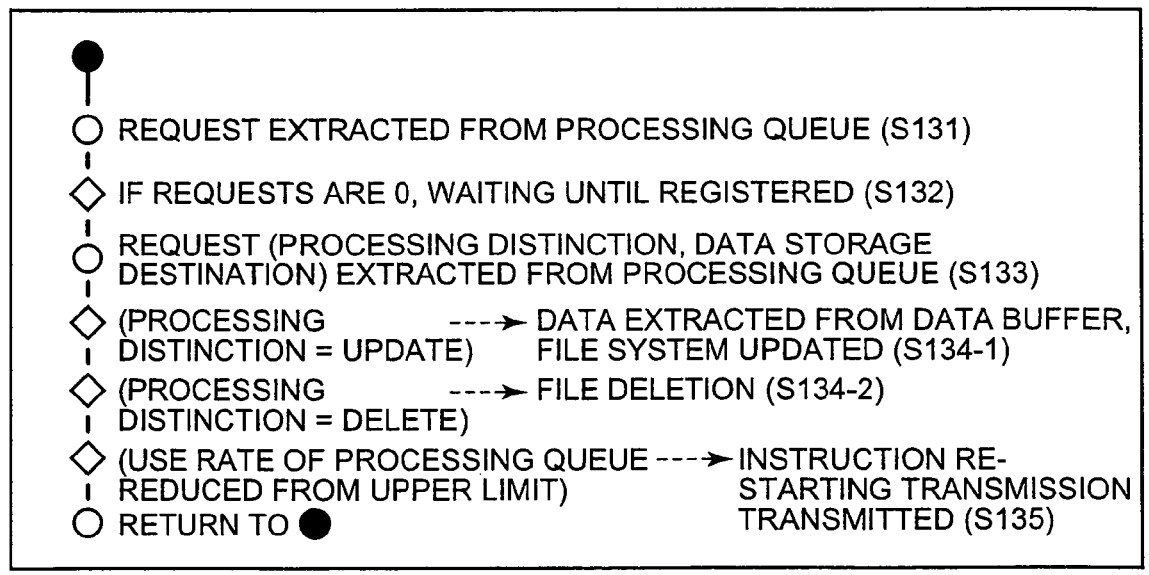
FIG. 14B shows one example of the flow of the processing that is performed by the file updating processing part.

FIG. 14B shows one example of the flow of the processing that is performed by the file updating processing portion 91.

The file updating processing portion 91 extracts a request (processing command) from the processing queue 90A (S131). If the number of requests is zero, the file updating processing portion 91 waits until a request is registered in the processing queue 90A (S132).

The file updating processing portion 91 acquires a request (S133). If the processing distinction is "write" in the acquired request, the file updating processing portion 91 acquires a data file (or directory) from a location (location in the data buffer 90B) that is specified by this request, and stores the acquired data file in the SVOL 3S; as a result, the file system 5R is updated (S134-1). Furthermore, when the processing distinction is "delete" in the acquired request, the file updating processing portion 91 deletes the data file specified by this request from the SVOL 3S; as a result, the file system 5R is updated (S134-2). Furthermore, when the SVOL 3S is updated (e.g., when data is written or deleted), a differential snapshot is stored in the differential VOL 3D by copy-on-write in the remote host 71R.

The file updating processing portion 91 transmits an instruction re-starting transmission to the local host 5L if the use rate of the processing queue 90A (e.g., the number of requests accumulated in the processing queue 90A) has decreased from a specified upper limit value (e.g., the upper limit value read out from the storage region) (S135).

Thus, in the second example described above, if the use rate of the differential VOL 3D is higher than a specified threshold value, the transfer of data is interrupted, and the PVOL 3P and SVOL 3S are logically separated; as a result, the copy-on-write to the differential VOL 3D from the SVOL 3S is stopped. Furthermore, if the use rate of the differential VOL 3D decreases, the copy-on-write is re-started. Accordingly, the overflow of differential snapshots from the differential VOL 3D can be prevented in advance.

Furthermore, in this second example, the local side remote copying processing portion may receive data read-out requests. In this case, data present on the remote side is acquired via the data transfer line 83, and this data can also be provided to the business application 73.

Furthermore, in this second example, the data transfer line 83 may be a dedicated line or a communications network such as an LAN or the like.

Furthermore, in this second example, the PVOL 3P is located on the local side, and the SVOL 3S and differential VOL 3D are located on the remote side. However, the PVOL 3P and SVOL 3S may be located on the local side, and the differential VOL 3D may be located on the remote side, as shown in FIG. 15. In this case, when the local host 71L has updated the PVOL 3P, the local host 71L causes the results of updating to be reflected in the SVOL 3S. Furthermore, when the updating results are reflected in the SVOL 3S, the local host 71L may produce a differential snapshot, and may also produce information that is used to specify the updating order of the SVOL 3S (hereafter referred to as "updating order information"), and a set consisting of such updating order information and a differential snapshot may be transmitted to the remote host 71R. The remote host 71R can accumulate such received sets of updating order information and differential snapshots in a storage region (not shown in the figures), and can acquire a differential snapshot from the storage region (e.g., region in a memory or disk type storage device) in accordance with the updating order specified by the updating order information. This differential snapshot can be stored in the differential VOL 3D. Furthermore, the updating order information may be a number that indicates the updating order, or may be a time stamp indicating the date and time of the updating of the SVOL 3S.

Preferred embodiments and several examples of the present invention were described above. However, these are merely examples used to illustrate the present invention; the scope of the present invention is not limited to these embodiments and modifications alone. The present invention can be worked in various configurations. The embodiments and examples are not limited to an NAS; these examples may also be applied to, for example, an SAN, and can be applied to either open systems or main frame systems.

What is claimed is:

1. A system for controlling the updating of a storage device, comprising:

an acquisition portion which acquires a use rate of a second storage device into which update data relating to the updating of a first storage device is written, and a threshold value of this use rate;

a first updating stopping portion which judges whether or not the acquired use rate has exceeded the acquired threshold value, and which stops the updating of the second storage device if the result of the judgment is affirmative; and an updating-stop canceling portion which cancels the stopping if it is detected that the use rate of the second storage device has decreased after the stopping has been performed, wherein the first storage device is a secondary storage device, the second storage device is a storage device used for update data, a primary storage device into which data is written as a result of the reception of a write request by the file system is also provided;

wherein the primary storage device and the secondary storage device are arranged to be logically connected and logically cut off from each other, and when the primary storage device and the secondary storage device are logically connected, data that has been written in the primary storage device is copied into the secondary storage device;

wherein the first updating stopping portion stops the reception of write requests by the file system, and the stopping is performed by cutting off the logical connection between the primary storage device and the secondary storage device; and wherein the second updating stopping portion sets a lock that is used to prohibit the updating of data corresponding to update data that is to be read out among one or more sets of data accumulated in the primary storage device or the secondary storage device each time that the update data is read out; acquires a lock waiting time which is a length of time that is required in order to set the each lock, an upper limit value of this lock waiting time, and a frequency threshold value; investigates the number of times that the lock waiting time exceeds the upper limit value to judge whether or not the number of times that the upper limit value is exceeded exceeds the frequency threshold value; and if the result of this judgment is affirmative, stops the reception of write requests by the file system, with this stopping being performed by cutting off the logical connection between the primary storage device and the secondary storage device.

2. A system for controlling the updating of a storage device, comprising:

an acquisition portion which acquires a use rate of a second storage device into which update data relating to the updating of a first storage device is written, and a threshold value of this use rate;

a first updating stopping portion which judges whether or not the acquired use rate has exceeded the acquired threshold value, and which stops the updating of the second storage device if the result of the judgment is affirmative; and an updating-stop canceling portion which cancels the stopping if it is detected that the use rate of the second storage device has decreased after the stopping has been performed, wherein the first storage device is a secondary storage device, the second storage device is a storage device used for update data, a primary storage device into which data is written as a result of the reception of a write request by the file system is also provided;

wherein the primary storage device and the secondary storage device are arranged to be logically connected and logically cut off from each other, and when the primary storage device and the secondary storage device are logically connected, data that has been written in the primary storage device is copied into the secondary storage device;

wherein the first updating stopping portion stops the reception of write requests by the file system, and the stopping is performed by cutting off the logical connection between the primary storage device and the secondary storage device; and wherein the acquisition portion acquires another threshold value, and when the use rate is below this other threshold value, the acquisition portion acquires the use rate and threshold value of the same periodically, and when the use rate exceeds another threshold value, the acquisition portion acquires the use rate and threshold value of the same each time that the file system receives a write request.

3. A system for controlling the updating of a storage device, wherein if data written into a primary storage device is copied into a secondary storage device, and if the data is copied into the secondary storage device, then a snapshot of the secondary storage device is accumulated in a storage device used for snapshots by copy-on-write, the system comprising:

a storage region for storing a threshold value for a use rate of the storage device used for snapshots; and a processor which is operated by reading in at least one computer program; the processor acquires a use rate of the storage device used for snapshots, judges whether or not the acquired use rate has exceeded the threshold value, and stops the copy-on-write if the result of the judgment is affirmative, wherein if the data is written into the primary storage device as a result of the reception of write request by the file system, the data that is written into the primary storage device is copied into the secondary storage device that is logically connected to the primary storage device, and the data is copied into the secondary storage device, then a snapshot of the secondary storage device is accumulated in a storage device used for snapshots by copy-on-write;

wherein, if the result of the judgment is affirmative, the processor stops the reception of write requests by the file system and also stops the copy-on-write by cutting off the logical connection between the primary storage device and the secondary storage device, and the processor re-starts the copy-on-write by logically connecting the primary storage device and the secondary storage device to each other when the use rate of the storage device used for snapshots has decreased; and wherein the processor sets a lock that is used to prohibit the updating of data corresponding to update data that is to be read out among one or more sets of data accumulated in the primary storage device or the secondary storage device each time that update data is read out; the acquires a lock waiting time which is a length of time that is required in order to set the each lock, an upper limit value of this lock waiting time, and a frequency threshold value; investigates the number of times that the lock waiting time exceeds the upper limit value to judge whether or not the number of times that the upper limit value has been exceeded exceeds the frequency threshold value; stops the reception of write commands by the file system if the result of the judgment is affirmative; and stops the copy-on-write by cutting off the logical connection between the primary storage device and the secondary storage device.

4. A system for controlling the updating of a storage device, wherein if data written into a primary storage device is copied into a secondary storage device, and if the data is copied into the secondary storage device, then a snapshot of the secondary storage device is accumulated in a storage device used for snapshots by copy-on-write, the system comprising:
- a storage region for storing a threshold value for a use rate of the storage device used for snapshots;
- a processor which is operated by reading in at least one computer program,
- the processor acquires a use rate of the storage device used for snapshots, judges whether or not the acquired use rate has exceeded the threshold value, and stops the copy-on-write if the result of the judgment is affirmative;
- a first site which is connected to the primary storage device, and which outputs data updating requests; and
- a second site which is connected to the secondary storage device and the storage device used for snapshots, and which receives the updating requests, wherein the second site has a storage region that is used to accumulate the updating requests, outputs a transmission interruption instruction to the first site when the use rate of the storage region exceeds a specified value, and outputs a transmission re-start instruction to the first site when the use rate of the storage region drops below the specified value, and wherein, when the first site receives the transmission interruption instruction, even if data has been written into the first site does not transmit this data to the secondary storage device until the transmission re-start instruction is received.

* * * * *